United States Patent
Inoue et al.

(10) Patent No.: US 9,782,912 B2
(45) Date of Patent: Oct. 10, 2017

(54) METHOD FOR PRODUCING HONEYCOMB STRUCTURE, JIG, AND HONEYCOMB STRUCTURE

(71) Applicant: SUMITOMO CHEMICAL COMPANY, LIMITED, Chuo-ku, Tokyo (JP)

(72) Inventors: Masashi Inoue, Niihama (JP); Tatsuya Naito, Niihama (JP); Hiroyuki Ikawa, Tsukuba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 15/041,799

(22) Filed: Feb. 11, 2016

(65) Prior Publication Data

US 2016/0158965 A1 Jun. 9, 2016

Related U.S. Application Data

(63) Continuation of application No. PCT/JP2014/064417, filed on May 30, 2014.

(30) Foreign Application Priority Data

Aug. 12, 2013 (JP) .................................. 2013-167359

(51) Int. Cl.
   - B28B 11/00 (2006.01)
   - F01N 3/28 (2006.01)
   - F01N 3/022 (2006.01)

(52) U.S. Cl.
   CPC .......... B28B 11/006 (2013.01); F01N 3/0222 (2013.01); F01N 3/2828 (2013.01); F01N 2330/06 (2013.01); F01N 2330/34 (2013.01)

(58) Field of Classification Search
   CPC ...... B01J 35/04; F01N 3/0222; F01N 3/2828; F01N 2330/06; F01N 2330/34
   See application file for complete search history.

(56) References Cited

U.S. PATENT DOCUMENTS

| | | | |
|---|---|---|---|
| 2006/0197252 | A1 | 9/2006 | Ishikawa et al. |
| 2007/0096370 | A1 | 5/2007 | Aoki |

FOREIGN PATENT DOCUMENTS

| | | |
|---|---|---|
| FR | 1 357 802 | 4/1964 |
| JP | H-508199 | 9/1996 |

(Continued)

OTHER PUBLICATIONS

International Preliminary Report, in corresponding Application No. PCT/JP2014/064417, mailed Feb. 25, 2016, 2 pages.

(Continued)

*Primary Examiner* — Christina Johnson
*Assistant Examiner* — Xue Liu
(74) *Attorney, Agent, or Firm* — Finnegan, Henderson, Farabow, Garrett & Dunner, LLP

(57) ABSTRACT

In a green honeycomb molded body including a columnar body of the green honeycomb molded body in which a plurality of hexagonal cells mutually partitioned by partition walls are open at an end surface of the columnar body, a center closing jig is inserted into a part of a plurality of cells at the center of the end surface to join partition walls to each other using the center closing jig, thereby closing the cells at the center of the end surface and the outer periphery of the end surface including the plurality of cells is pressed by a cylindrical outer periphery closing jig having an inner peripheral surface with the inner diameter being continuously reduced from one end to the other end, thereby collapsing the cells at the outer periphery of the end surface to close the cells at the outer periphery of the end surface.

2 Claims, 21 Drawing Sheets

(56) References Cited

FOREIGN PATENT DOCUMENTS

| JP | H- 508199 | 9/1996 | | |
|---|---|---|---|---|
| JP | 2004-097994 | 4/2004 | | |
| JP | 2004-322051 | 11/2004 | | |
| JP | 2006-272318 | 10/2006 | | |
| JP | 2006-272318 A | 10/2006 | | |
| JP | 2007-125737 | 5/2007 | | |
| JP | 2007-125737 A | 5/2007 | | |
| JP | WO 2012014034 A1 * | 2/2012 | ............. | F02D 41/08 |
| JP | WO 2012141034 A1 * | 10/2012 | ......... | B01D 46/2455 |
| JP | 2012-219736 | 11/2012 | | |
| JP | 2012-219736 A | 11/2012 | | |
| WO | WO 94/22556 | 10/1994 | | |

OTHER PUBLICATIONS

Written Opinion in corresponding Application No. PCT/JP2014/064417, mailed Aug. 9, 2014, 5 pages.
International Preliminary Report on Patentability, in corresponding International Application No. PCT/JP2014/064417, mailed Feb. 25, 2016.
International Search Report, in corresponding International Application No. PCT/JP2014/064417, mailed Aug. 19, 2014.
Written Opinion of the International Searching Authority, in corresponding International Application No. PCT/JP2014/064417, mailed Aug. 19, 2014.
Extended European Search Report dated Apr. 11, 2017 for counterpart PCT/JP2014064417.
Notice of Reasons for Rejection mailed Jan. 4, 2017 for counterpart Japanese Patent Application No. P2013-167359.
Extended European Search Report dated Apr. 11, 2017 for counterpart 14836798.0.

* cited by examiner

METHOD FOR PRODUCING HONEYCOMB STRUCTURE, JIG, AND HONEYCOMB STRUCTURE

CROSS REFERENCE TO RELATED APPLICATIONS

This application is a continuation application based on PCT/JP2014/064417, filed May 30, 2014, which claims the priority of Japanese Patent Application No. 2013-167359, filed Aug. 12, 2013, the content of each application being incorporated herein by reference.

TECHNICAL FIELD

An aspect of the present invention relates to a method for producing a honeycomb structure, a jig, and a honeycomb structure, and relates to a method for producing a honeycomb structure in which a green honeycomb molded body is fired to produce a honeycomb structure, a jig, and a honeycomb structure.

BACKGROUND ART

For example, honeycomb hole structures made of ceramic and having a plurality of through-holes of a cross-sectional polygonal shape are conventionally known. Such honeycomb structures are used, for example, in particulate-matter-removing filters such as diesel particulate filters. In a production step of such honeycomb structures, a ceramic raw material powder is formed by extruding to produce a green honeycomb molded body. A part of through-holes in this green honeycomb molded body are closed at the end surface. A honeycomb structure is produced by firing the green honeycomb molded body with closed through-holes. Patent Literature 1 discloses a method for producing such honeycomb filters. In Patent Literature 1, projections in a closing jig having a plurality of quadrangular pyramid-shaped projections are inserted into a part of the through-holes in the green honeycomb molded body to gather together ends of partition walls that partition the through-holes and to connect the ends of these partition walls, thereby closing the through-holes.

CITATION LIST

Patent Literature

PTL 1: Japanese Unexamined Patent Publication No. H8-508199

SUMMARY OF INVENTION

Technical Problem

However, through-holes at the outer periphery of the end surface of the green honeycomb molded body have a non-uniform and small shape, and, thus, a closing jig to be inserted into the center of the green honeycomb molded body as such cannot be utilized for closing at the position of the outer periphery of the end surface. Therefore, a closing jig corresponding to the shape of through-holes at the outer periphery of the end surface of the green honeycomb molded body should be separately prepared. As described above, the shape of the through-holes at the outer periphery is non-uniform, and, thus, when the jig is prepared in accordance with the shape of the through-holes at the outer periphery, the preparation work is troublesome.

In this technical field, a method for producing a honeycomb structure that can close the through-holes at the outer periphery of the end surface of the green honeycomb molded body without the use of a jig in accordance with the shape of the through-holes at the outer periphery of the end surface of the green honeycomb molded body, a jig, and a honeycomb structure have been desired.

Solution to Problem

One aspect of the present invention is a method for producing a honeycomb structure comprising a columnar body having a plurality of holes that are open at an end surface of the columnar body, the method comprising: a center closing step of inserting a center closing jig into a part of a plurality of through-holes at the center of an end surface in a green honeycomb molded body in which a plurality of through-holes mutually partitioned by partition walls are open at the end surface of a columnar body to join the partition walls to each other, thereby closing the through-holes at the center of the end surface; and an outer periphery closing step of closing through-holes at an outer periphery of the end surface of the green honeycomb molded body by an outer periphery closing jig that is a cylindrical jig having an inner peripheral surface with the inner diameter being continuously reduced from one end to the other end, by pressing the outer periphery of the end surface by the inner peripheral surface to collapse the through-holes at the outer periphery, thereby closing the through-holes at the outer periphery of the end surface.

According to this construction, since pressing is carried out against the outer periphery of the end surface of the green honeycomb molded body with the outer periphery closing jig having a tapered inner peripheral surface, non-uniform through-holes included in the outer periphery of the end surface can be closed.

In this case, the method may further comprise a center closing jig withdrawing step of withdrawing the center closing jig and an outer periphery closing jig withdrawing step of withdrawing the outer periphery closing jig after the center closing jig withdrawing step.

According to this construction, the center closing jig is withdrawn in such a state that the outer periphery closing jig presses the outer periphery of the end surface of the green honeycomb molded body, making it possible to easily withdraw the center closing jig. Further, deformation of the outer periphery of the end surface of the green honeycomb molded body can be prevented when withdrawing the center closing jig.

The center closing step and the outer periphery closing step can be simultaneously carried out.

According to this construction, the outer periphery closing jig can press the outer periphery of the end surface of the green honeycomb molded body while accurately inserting the center closing jig into positions of the through-holes.

Another aspect of the present invention is a cylindrical jig that presses an outer periphery at an end surface of a green honeycomb molded body having a plurality of holes open at an end surface of a columnar body to close the through-holes at an outer periphery of the end surface, wherein the jig has an inner peripheral surface with the inner diameter being continuously reduced from one end to the other end and, when closing the through-holes at the outer periphery of the end surface of the green honeycomb molded body, the inner peripheral surface presses the outer periphery of the end surface of the green honeycomb molded body to collapse the through-holes at the outer periphery, thereby closing the through-holes at the outer periphery of the end surface.

According to this construction, the jig can close non-uniform through-holes at the outer periphery of the end surface of the green honeycomb molded body by pressing the jig against the end surface of the green honeycomb molded body.

Further, another aspect of the present invention is a jig comprising: a center closing portion that is insertable into a part of a plurality of through-holes at the center of an end surface in a green honeycomb molded body in which a plurality of through-holes mutually partitioned by partition walls are open at the end surface of a columnar body, and an outer periphery closing portion that presses the outer periphery of the end surface of the green honeycomb molded body in which a plurality of holes are open at the end surface of the columnar body to close the through-holes at the outer periphery of the end surface, wherein the center closing portion is inserted into a part of the plurality of through-holes at the center of the end surface of the green honeycomb molded body to join the partition walls to each other, thereby closing the through-holes at the center of the end surface, the outer periphery closing portion has an inner peripheral surface with the inner diameter being continuously reduced from one end to the other end, and, when closing the through-holes at the outer periphery of the end surface of the green honeycomb molded body, the inner peripheral surface presses the outer periphery of the end surface of the green honeycomb molded body to collapse the through-holes at the outer periphery, thereby closing the through-holes at the outer periphery of the end surface.

Further, another aspect of the present invention is a honeycomb structure comprising a columnar body with a plurality of holes being open at an end surface thereof, wherein, in a green honeycomb molded body in which a plurality of through-holes mutually partitioned by partition walls are open at an end surface of a columnar body, a part of a plurality of through-holes at the center of the end surface is closed, an outer periphery of the end surface has a chamfered portion with the outer diameter being continuously reduced towards the end surface and the through-holes at the outer periphery of the end surface are closed, and the green honeycomb molded body has been fired to produce the honeycomb structure.

Advantageous Effects of Invention

According to a method for producing a honeycomb structure according to one aspect of the present invention, the jig, and the honeycomb structure, since the outer periphery at the end surface of the green honeycomb molded body is pressed with a jig having a tapered inner peripheral surface, non-uniform through-holes included in the outer periphery of the end surface can be closed.

DESCRIPTION OF EMBODIMENTS

Embodiments of the present invention will be described in detail with reference to the drawings.

(Green Honeycomb Molded Body (Hexagonal Cells))

Figure 1:
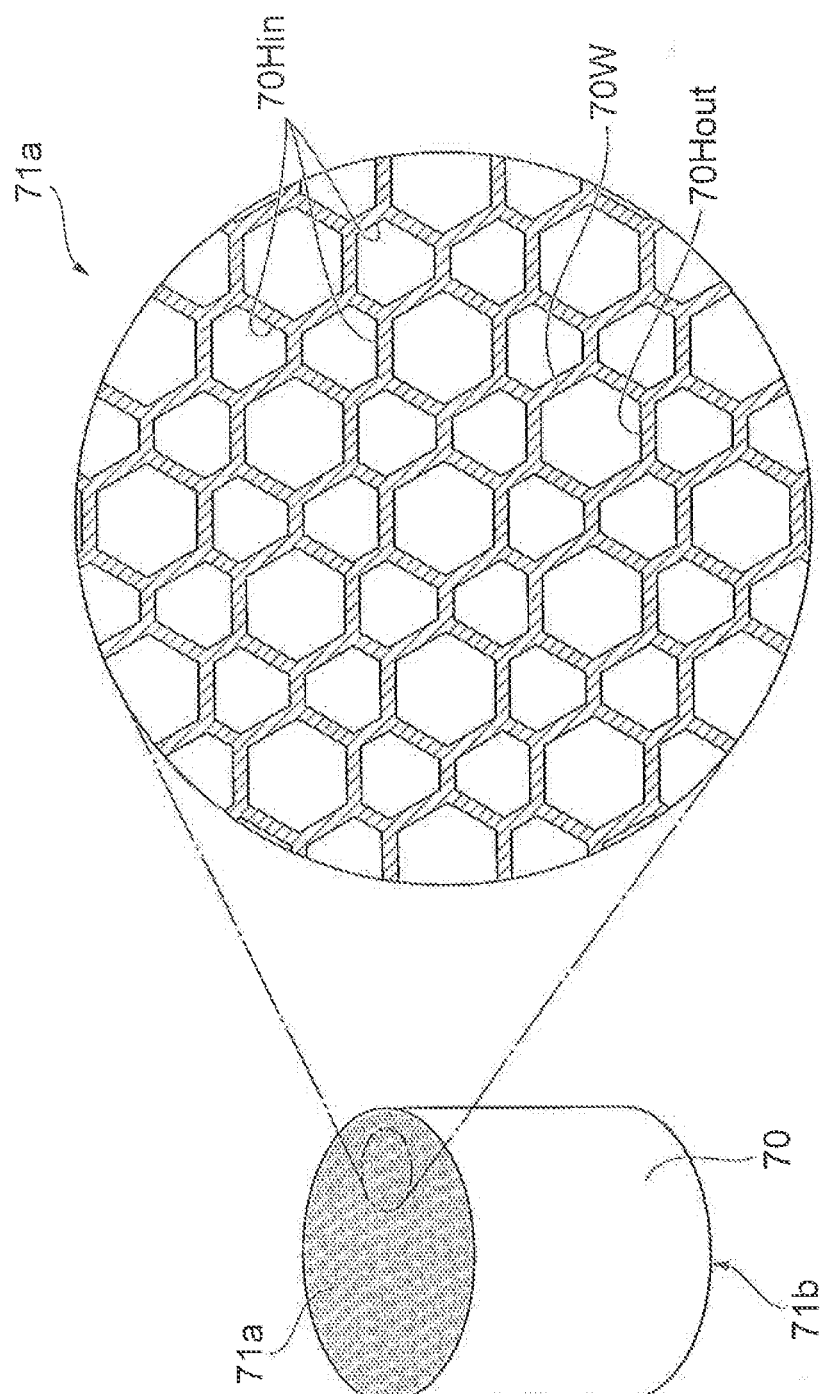
FIG. 1 is a perspective view and a partial enlarged view of a green honeycomb molded body having hexagonal cells before closing.

First, a green honeycomb molded body that is an object to be machined in the embodiment of the present invention will be described. As illustrated in FIG. 1, a green honeycomb molded body 70 according to this embodiment is, for example, a cylindrical body that has an upper surface 71$a$ and a lower surface 71$b$ and in which a plurality of hexagonal cells that are hexagonal through-holes are arranged substantially parallel in the upper surface 71$a$ and the lower surface 71$b$. The green honeycomb molded body 70 is an unfired molded body that, by firing later, becomes a porous ceramic. The length of the direction in which inlet-side hexagonal cells 70Hin in the green honeycomb molded body 70 and outlet-side hexagonal cells 70Hout extend is not particularly limited but may be, for example, 40 to 400 mm. The outer diameter of the green honeycomb molded body 70 is also not particularly limited but may be, for example, 10 to 360 mm.

The inlet-side hexagonal cells 70Hin and the outlet-side hexagonal cells 70Hout are each partitioned by partition walls 70W that extend substantially parallel to a central axis of the green honeycomb molded body 70. The thickness of the partition walls 70W may be not more than 0.8 mm, not more than 0.5 mm, and not less than 0.1 mm. It should be noted that the outer shape of the green honeycomb molded body 70 is not limited to a cylindrical shape and may be an elliptical column, an angular column (for example, a regular polygonal column such as a triangular column, a square column, a hexagonal column, or an octagonal column; or a triangular column, a square column, a hexagonal column, or an octagonal column other than the regular polygonal column) or the like. In this embodiment, a cylindrical honeycomb structure will be described. Further, in this embodiment, a green honeycomb molded body 70 including inlet-side hexagonal cells 70Hin and outlet-side hexagonal cells 70Hout that are hexagonal through-holes and different from each other in size will be given as an example. However, green honeycomb molded bodies 70 including cells that are through-holes that have a regular hexagonal shape may also be used.

Such a green honeycomb molded body 70 is produced by extruding a ceramic composition with an extruder. In this case, in order to prepare a ceramic composition, a powder of an inorganic compound source which is a ceramic raw material, an organic binder, a solvent, and, if necessary, additives to be added are provided.

Inorganic compound source powders include powders containing two or more types of powders selected from the group consisting of aluminum source powders, magnesium source powders, silicon source powders, and titanium source powders, or powders containing any one of one or more types of powders selected from silicon carbide source powders, silicon nitride source powders, and aluminum nitride source powders. In order to improve heat resistance and mechanical strength of products, one or more types of any one of carbon source powders, zirconium source powders, molybdenum source powers, and calcium source powders may be added to the inorganic compound source powders. Including aluminum source powders, magnesium source powders, titanium source powders, and silicon source powders can improve heat resistance. Examples of organic binders include celluloses such as methylcellulose, carboxylmethylcellulose, hydroxyalkylmethylcellulose, and sodium carboxylmethylcellulose; alcohols such as polyvinyl alcohol; and lignin sulfonic acid salts. Additives include, for example, pore forming agents, lubricating agents and plasticizers, dispersing agents, and solvents.

The green honeycomb molded body according to this embodiment is produced by mixing the prepared raw materials with a kneader or the like to obtain a raw material mixture and extruding the raw material mixture thus obtained through an extruder having an outlet opening corresponding to the sectional shape of the partition walls 70W.

(Ultrasonic Closing Machine)

Figure 2:
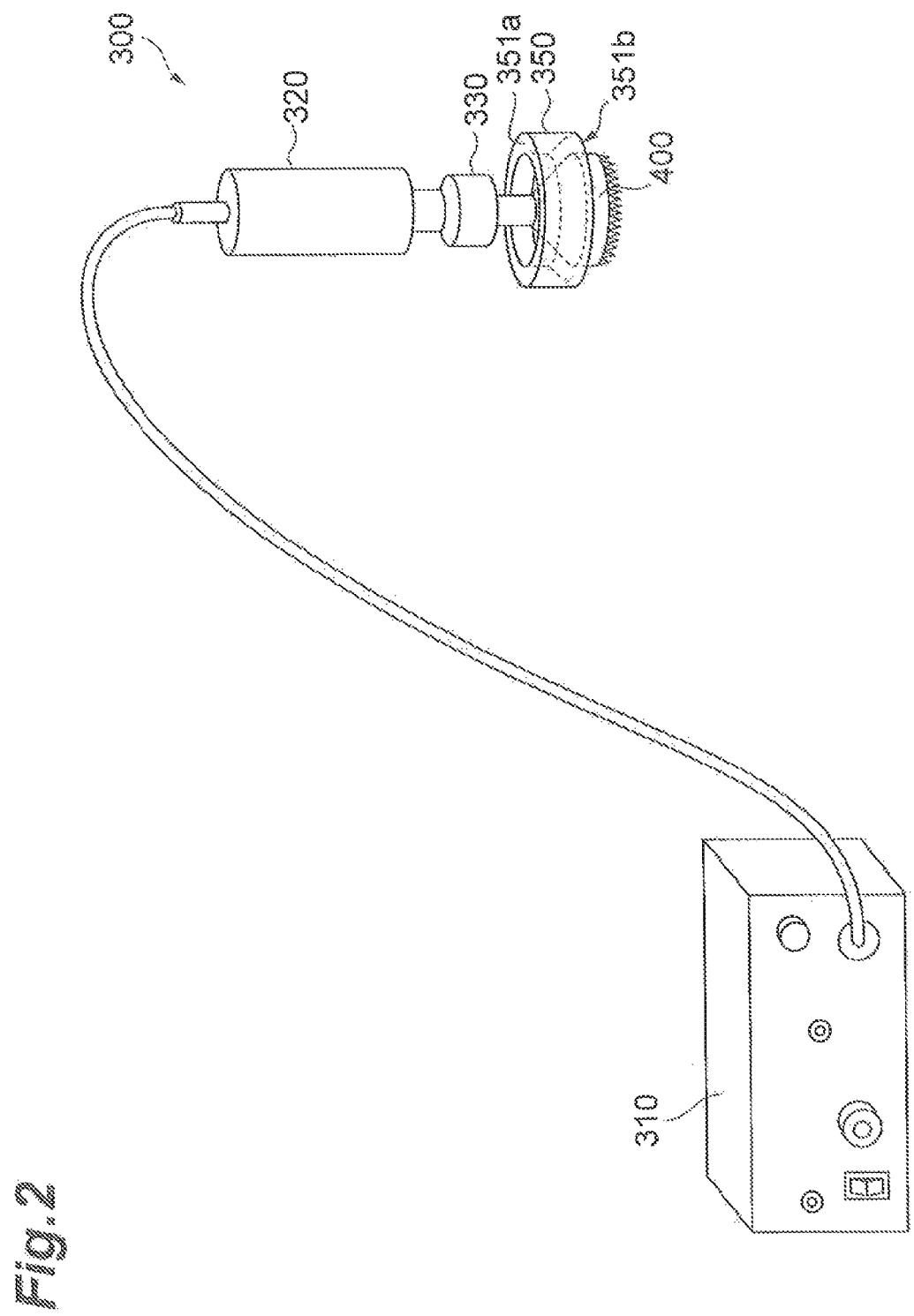
FIG. 2 is a perspective view of a closing apparatus for a green honeycomb molded body according to an embodiment.

An ultrasonic closing machine in this embodiment will be described below. As illustrated in FIG. 2, an ultrasonic closing machine 300 in this embodiment includes an ultrasonic signal transmitter 310, an ultrasonic vibrator 320, a horn 330, an outer periphery closing jig 350, and a center closing jig 400. The ultrasonic signal transmitter 310 transmits electric ultrasonic signals. The ultrasonic vibrator 320 converts electric ultrasonic signals supplied from the ultrasonic signal transmitter 310 to mechanical ultrasonic vibration. The horn 330 amplifies the amplitude of the ultrasonic vibration supplied from the ultrasonic vibrator 320. The center closing jig 400 is vibrated at a frequency of about 20 to 40 kHz by the ultrasonic vibration supplied from the horn 330.

(Center Closing Jig and Outer Periphery Closing Jig)

Figure 3:
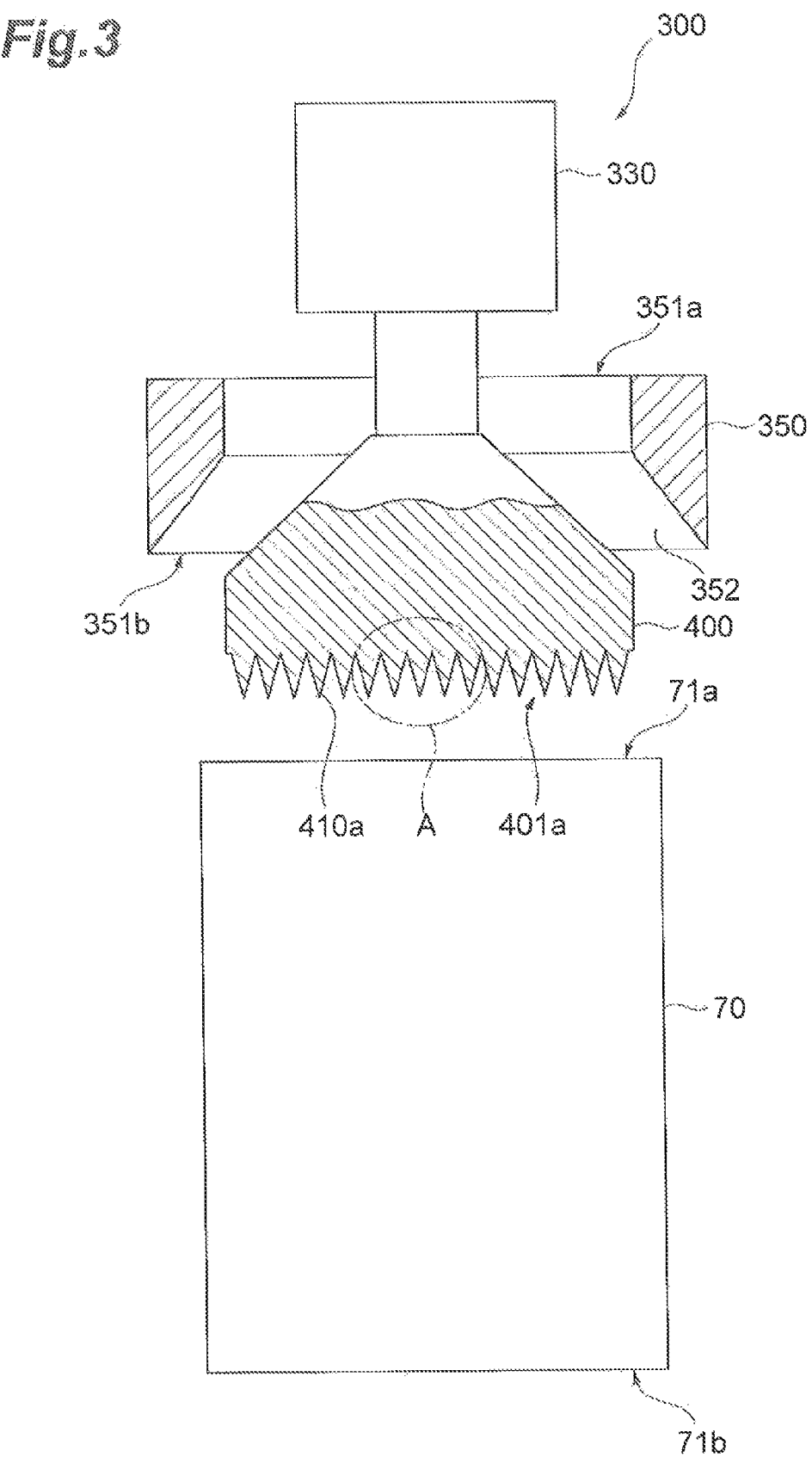
FIG. 3 is a partial cross-sectional view of a closing jig for the green honeycomb molded body having hexagonal cells according to the embodiment.

An explanation will be made regarding the center closing jig 400 and the outer periphery closing jig 350 in this embodiment. The center closing jig 400 in this embodiment is a jig that conducts closing hexagonal cells in centers of both ends surfaces (top surface 71a and lower surface 71b) of the green honeycomb molded body 70 having hexagonal cells in mutually different modes. Firstly, an explanation will be made regarding a closing jig for closing the top surface 71a that serves as a supply side (inlet side) of an exhaust gas in a particulate substance removing filter such as a diesel particle filter after firing of the green honeycomb molded body 70. As illustrated in FIG. 3, the center closing jig 400 in this embodiment includes a closing surface 401a that closes the green honeycomb molded body 70. The closing surface 401a includes a plurality of closing projections 410a that are arranged at positions corresponding to a part of the hexagonal cells and each are inserted into a part of the hexagonal cells to weld (join) the partition walls 70W to each other, thereby closing the hexagonal cells.

The outer periphery closing jig 350 in this embodiment is a jig that conducts closing of the hexagonal cells at the outer periphery of both end surfaces of the green honeycomb molded body 70. The outer periphery closing jig 350 is a cylindrical jig that, when closing the hexagonal cells at the outer periphery of the end surface, presses the outer periphery of both end surfaces of the green honeycomb molded body 70 to close the hexagonal cells at the outer periphery of both end surfaces of the green honeycomb molded body 70. Specifically, as illustrated in FIG. 2, the outer periphery closing jig 350 is a cylindrical body having openings that pass through both end surfaces (a top end surface 351a and a lower end surface 351b). As illustrated in FIGS. 2 and 3, the outer periphery closing jig 350 has an inner peripheral surface 352 with the inner diameter being continuously reduced from one end (the lower end surface 351b) to the other end (the upper end surface 351a).

Specifically, the inner peripheral surface 352 of the outer periphery closing jig 350 is an inclined surface with the inner diameter of the outer periphery closing jig 350 being reduced from the lower end surface 351b to the upper end surface 351a so that the outer periphery of the end surface of the green honeycomb molded body 70 can easily be pressed. When the green honeycomb molded body 70 is an elliptical column or a polygonal column rather than a cylindrical body, the shape of openings in the outer periphery closing jig 350 may be the same as the end surface of the green honeycomb molded body 70 and may form an inner peripheral surface 352 with the area of openings being continuously reduced from one end to the other end.

The degree of the inner diameter reduced depends greatly upon the degree of chamfering (for example, 1 to 10 mm) of the green honeycomb molded body 70 that will be described later. The angle of the inclined surface is defined based on a chamfering angle (an angle that a side surface of the green honeycomb molded body 70 makes with a chamfered surface) of the green honeycomb molded body 70 and is, for example, 10 to 80 degrees. In this embodiment, the center closing jig 400 and the outer periphery closing jig 350 may be integratable with each other or separable from each other.

Figure 4:
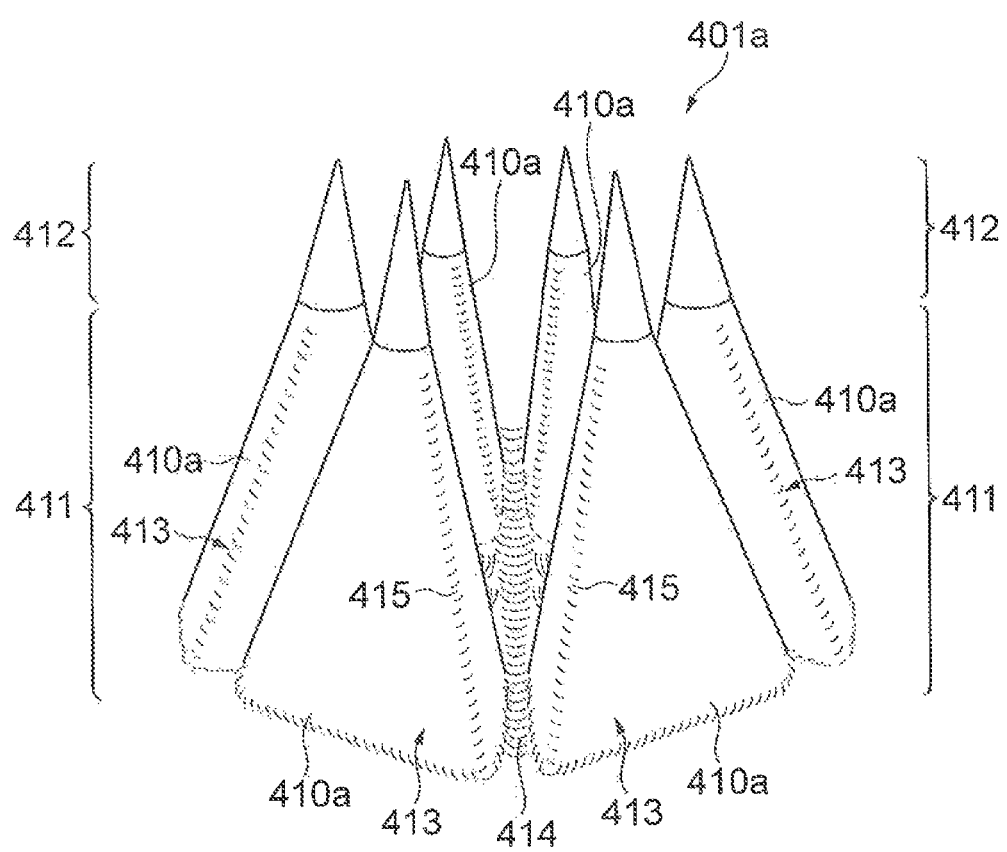
FIG. 4 is an enlarged perspective view of a portion A in FIG. 3.
Figure 5:
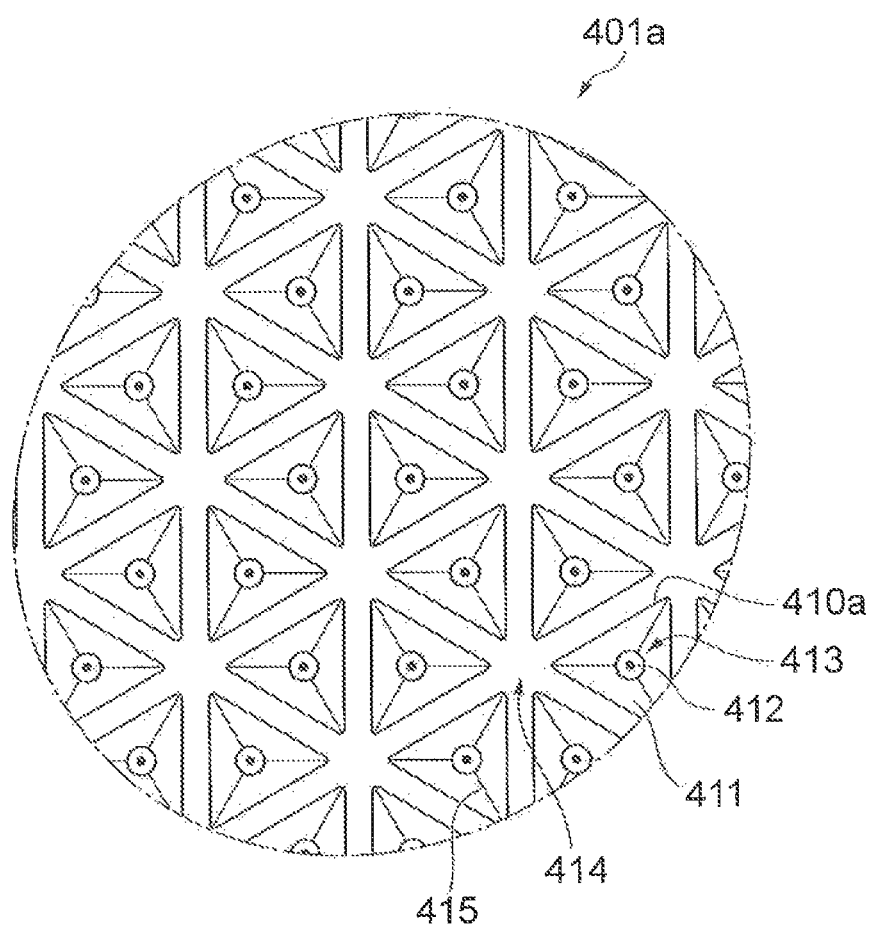
FIG. 5 is an enlarged plan view of the portion A in FIG. 3.
Figure 6:
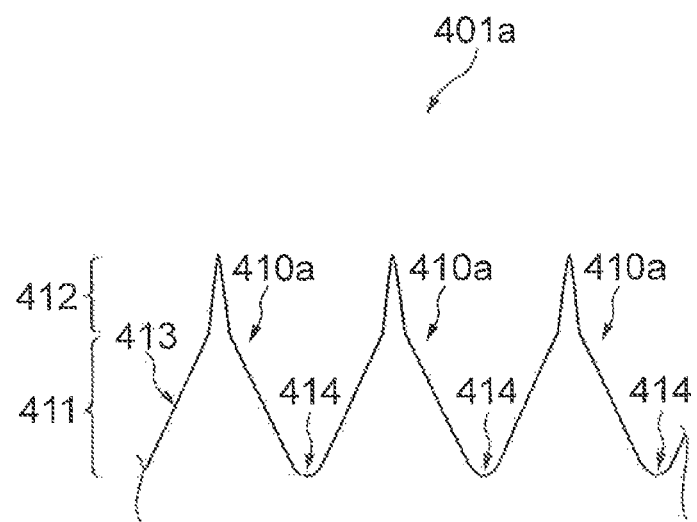
FIG. 6 is an enlarged cross-sectional view of the portion A in FIG. 3.

Subsequently, closing projections 410a in the center closing jig 400 will be explained. As illustrated in FIGS. 4 to 6 that are an enlarged view of a portion A of FIG. 3, the closing projections 410a include a triangular pyramid-shaped base 411 and a conical tip 412. The triangular pyramid-shaped base 411 is located at a base of the closing projections 410a and is projected from the closing surface 401a. The triangular pyramid-shaped base 411 has a truncated triangular pyramid shape in which a triangular pyramid reduced similarly from a triangular pyramid having a larger apex angle than the conical tip 412 is removed. The conical tip 412 is located at a position that is a tip of the closing projections 410a and above the triangular pyramid-shaped base 411. The conical tip 412 has a conical shape having a bottom surface having a size corresponding to the upper surface of the triangular pyramid-shaped base 411. The apex angle of the conical tip 412 is smaller than the apex angle defined by lateral edges of the truncated triangular pyramid of the triangular pyramid-shaped base 411.

The triangular pyramid-shaped base 411 includes a triangular pyramid lateral surface 413 that is a side surface of the truncated triangular pyramid; and a roundness chamfering lateral edge 415 on the lateral edge of the truncated triangular pyramid. In the roundness chamfering lateral edge 415, roundness chamfering has been conducted at a prescribed curvature for each lateral edge of the truncated triangular pyramid. Further, the valley between the triangular pyramid-shaped bases 411 in adjacent closing projections 410a includes a roundness chamfering valley 414 that is a concave formed by roundness chamfering at a prescribed curvature.

As illustrated in FIG. 5, the apexes of the conical tip 412 in the respective closing projections 410a are arranged at respective positions so as to correspond to six inlet-side hexagonal cells 70Hin that adjoin around one outlet-side hexagonal cell 70Hout as a center in the plurality of hexagonal cells 70 in the green honeycomb molded body 70. Further, the round chamfering lateral edges 415 of the triangular pyramid-shaped base 411 in the respective closing projections 410a are arranged in a direction in which the projections abut against partition walls 70W. The size of each of the triangular pyramid-shaped base 411 is such that the length that the round chamfering lateral edge 415 projecting on the closing surface 401a from just above the closing surface 401a is shorter than a length between the centers of adjacent hexagonal cells in the green honeycomb molded body 70.

(Inlet-Side Closing Step)

The step of closing the green honeycomb molded body 70 (a center closing step and an outer periphery closing step) in this embodiment will be described below. First, when the green honeycomb molded body 70 is applied to a particulate-matter-removing filter such as a diesel particulate filter after firing, the step of closing the upper surface 71a functioning as an exhaust gas supply side (an inlet side) will be described.

Figure 7:
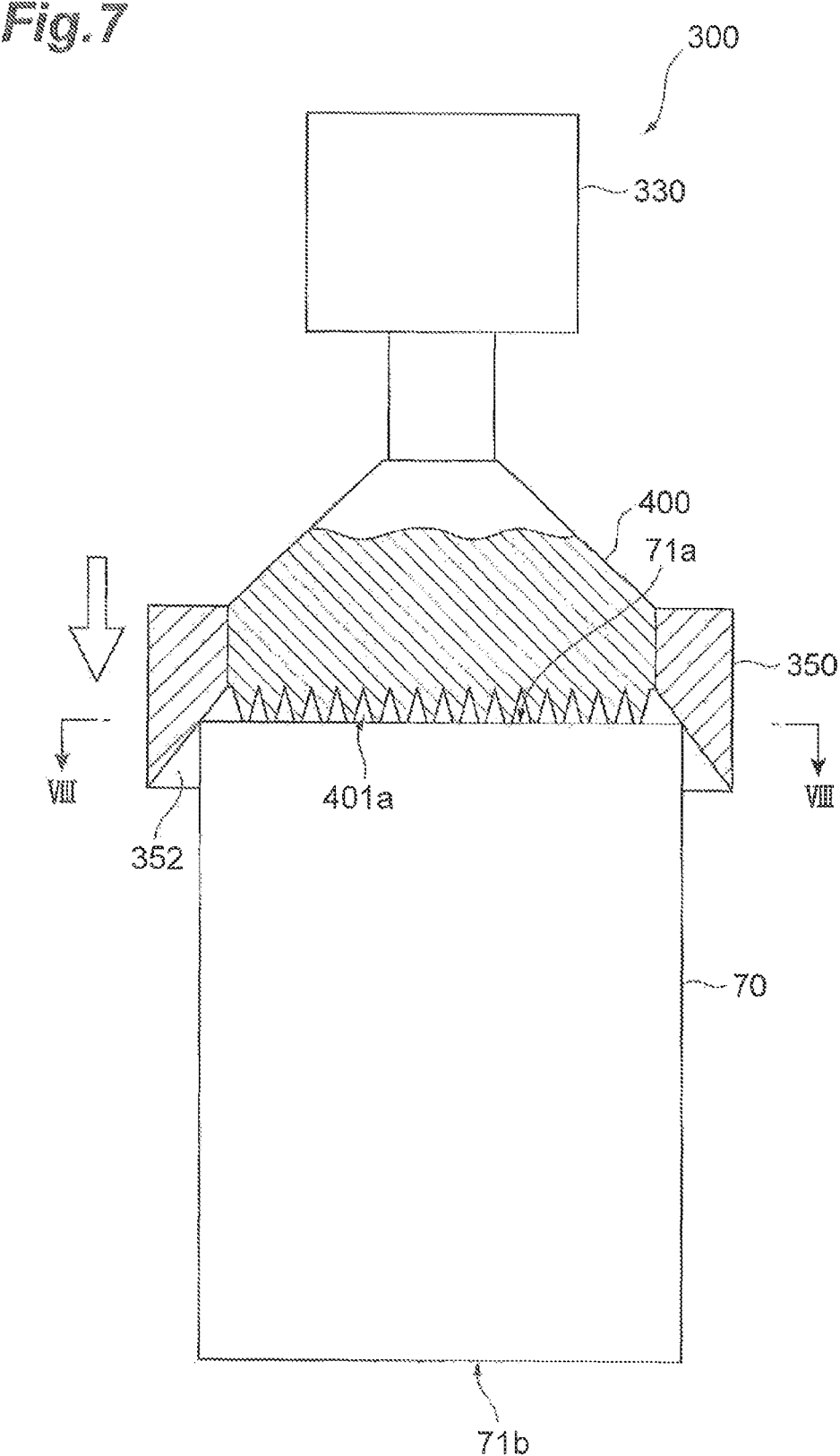
FIG. 7 is a partial cross-sectional view illustrating an initial state of a closing step on an inlet side of the green honeycomb molded body having hexagonal cells according to the embodiment.
Figure 8:
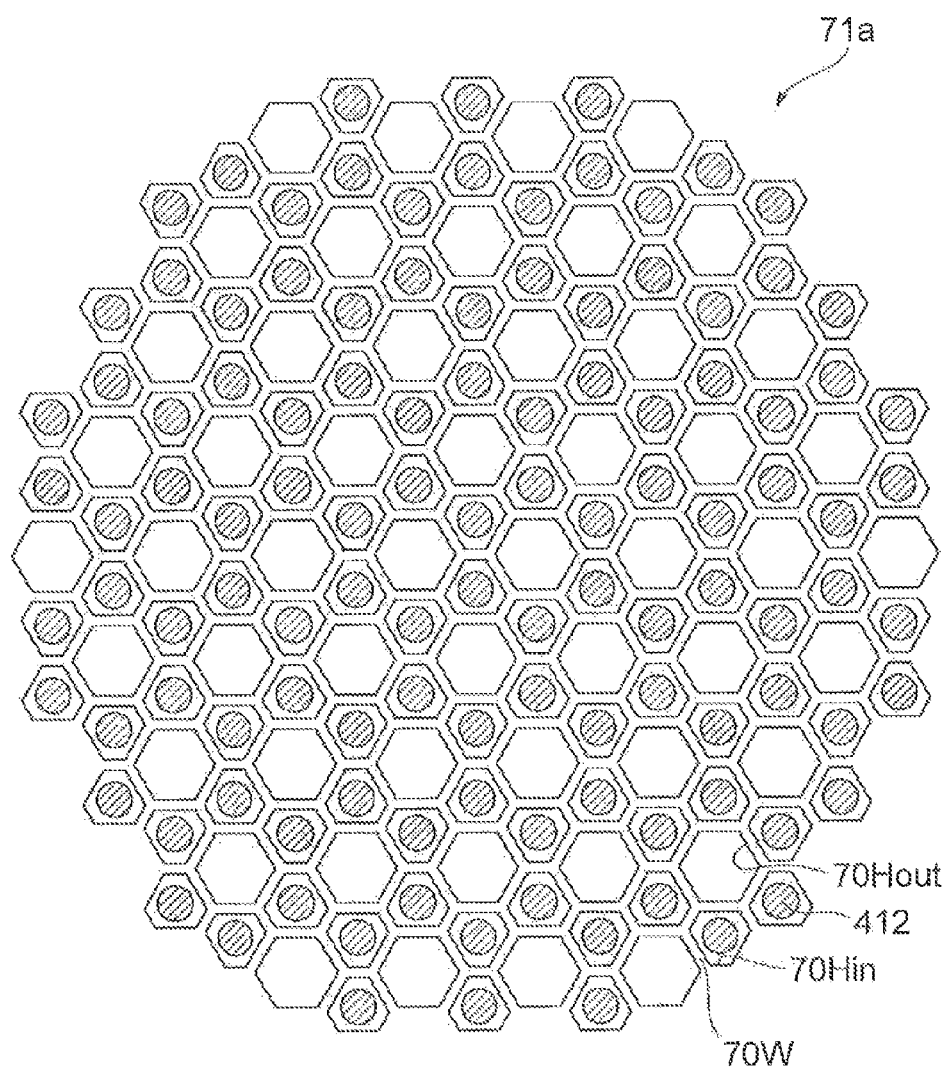
FIG. 8 is a cross-sectional view taken along line VIII-VIII of FIG. 7.

As illustrated in FIG. 7, the center closing jig 400 in the ultrasonic closing machine 300 is inserted into an end on the upper surface 71a of the green honeycomb molded body 70, and, at the same time, the outer periphery closing jig 350 is inserted. The closing jig 400 is vibrated by the ultrasonic vibration supplied from the horn 330. The tip of the closing projections 410a on the closing surface 401a is inserted into a part of the hexagonal cells. As illustrated in FIG. 8, a conical tip 412 in the closing surface 401a is inserted into six inlet-side hexagonal cells 70Hin that adjoin around one outlet-side hexagonal cells 70Hout as a center. The inner peripheral surface 352 of the outer periphery closing jig 350 abuts against the outer periphery of the upper surface 71a in the green honeycomb molded body 70.

Figure 9:
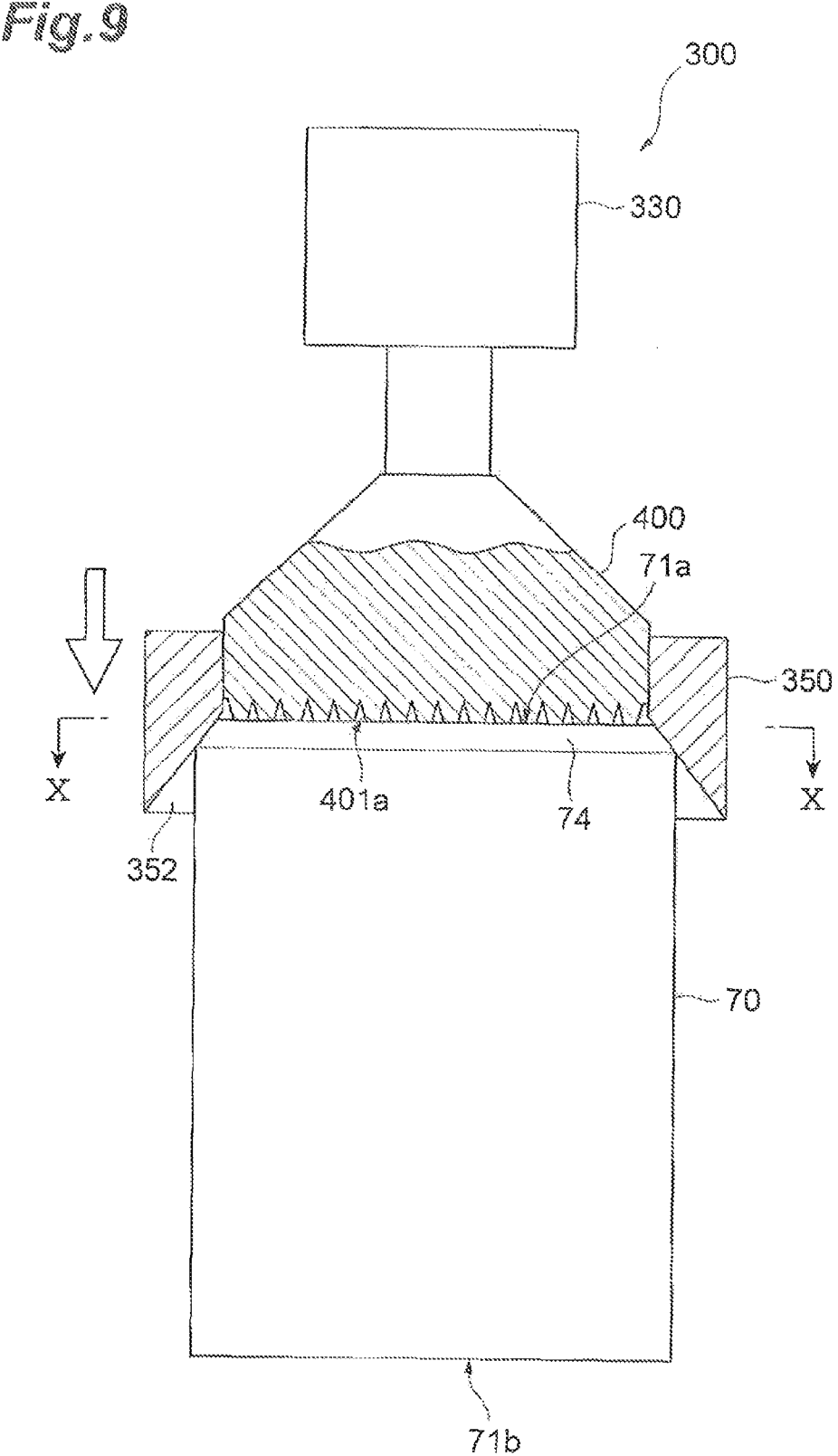
FIG. 9 is a partial cross-sectional view illustrating a middle state of the closing step in FIG. 7.
Figure 10:
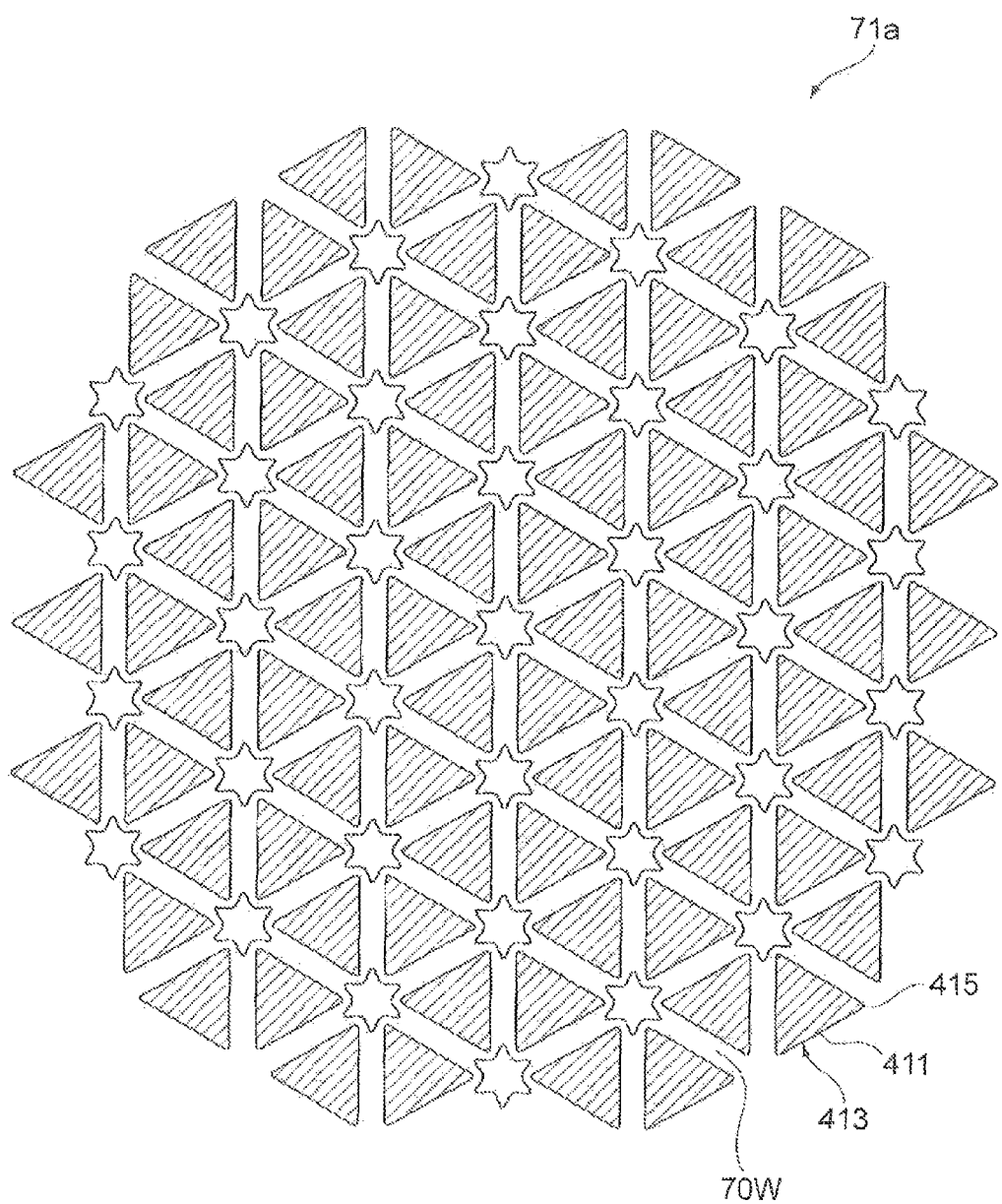
FIG. 10 is a cross-sectional view taken along line X-X of FIG. 9.

As illustrated in FIG. 9, when the closing projections 410a is further inserted into the inlet-side hexagonal cells 70Hin, as illustrated in FIG. 10, the triangular pyramid-shaped base 411 in the closing projections 410a is inserted into the inlet-side hexagonal cells 70Hin. The roundness chamfering lateral edges 415 of the triangular pyramid-shaped bases 411 are each allowed to abut against the respective partition walls 70W. Since the closing projections 410a are being vibrated by ultrasonic vibration, the partition walls 70W are liquefied and pressed so as to close outlet-side hexagonal cells 70Hout into which the closing projections 410a have not been inserted and that are located at the center of the six inlet-side hexagonal cells 70Hin into which the closing projections 410a have been inserted. The inner peripheral surface 352 of the outer periphery closing jig 350 presses the outer periphery of the upper surface 71a including a plurality of through-holes, collapses the through-holes of the outer periphery of the upper surface 71a, forms a chamfered portion 74, and closes the through-holes of the outer periphery of the upper surface 71a.

Figure 11:
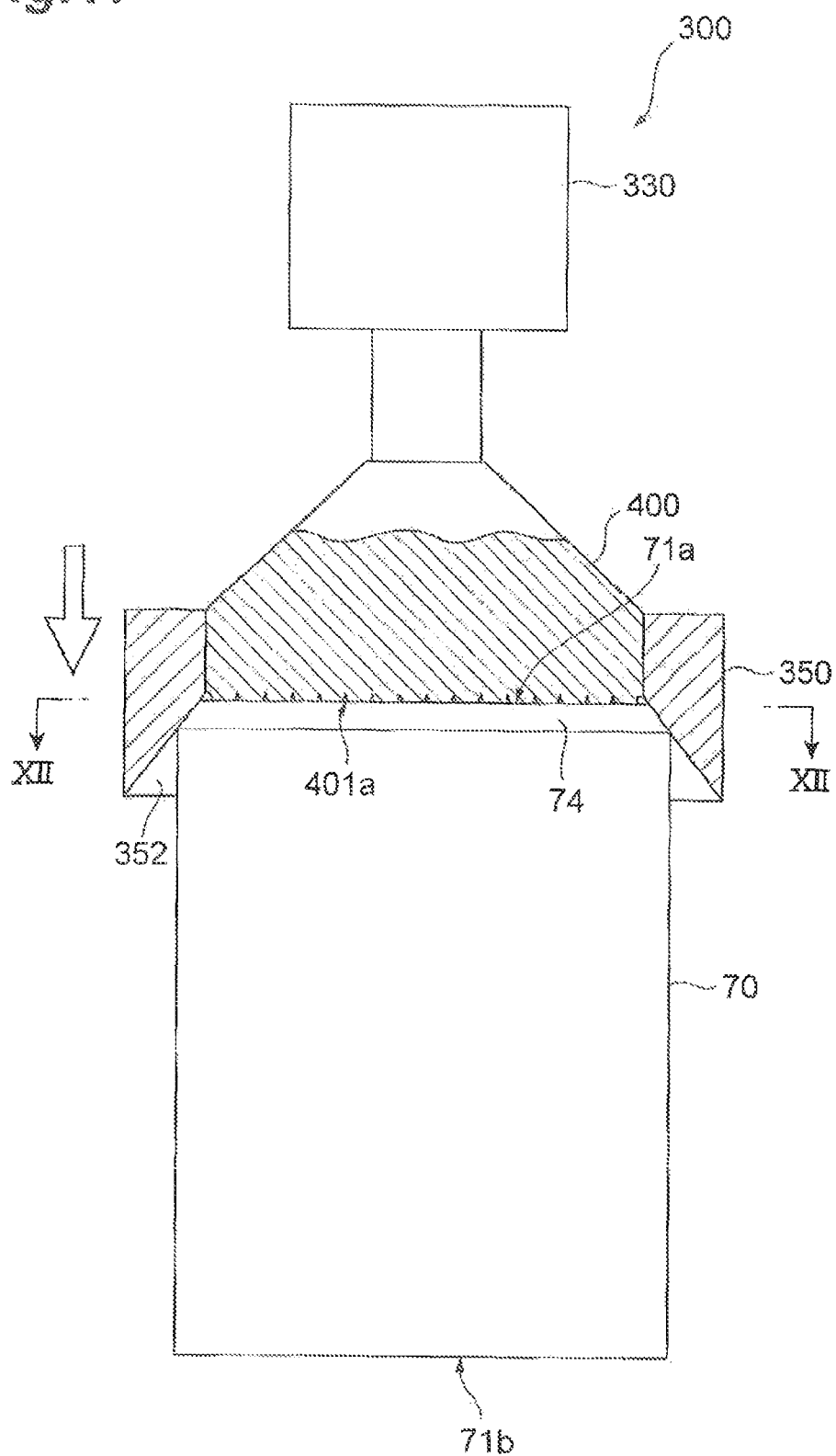
FIG. 11 is a partial cross-sectional view illustrating a final state of the closing step in FIG. 7.
Figure 12:
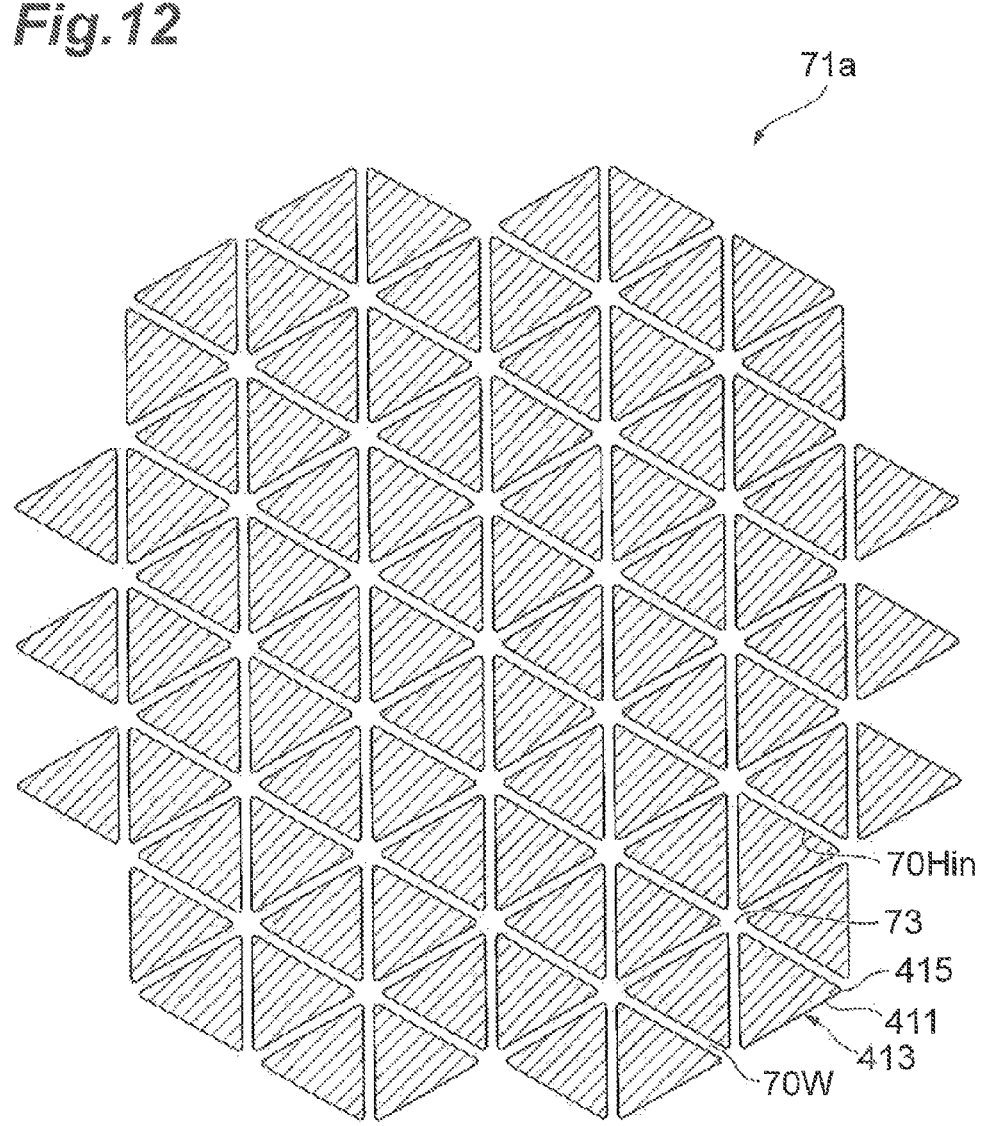
FIG. 12 is a cross-sectional view taken along line XII-XII of FIG. 11.

As illustrated in FIG. 11, when the closing projections 410a are further inserted into the inlet-side hexagonal cells 70Hin, as illustrated in FIG. 12, the partition walls 70W that are pressed from six directions while being liquefied by the roundness chamfering lateral edge 415 and the triangular pyramid lateral surface 413 in the triangular pyramid-shaped base 411 are integrally welded to each other. The end of the welded partition walls 70W is allowed to abut against the roundness chamfering valley 414 in the closing surface 401a, and a round partition wall joined end 73 is formed in such a state that roundness chamfering corresponding to the shape of the roundness chamfering valley 414 has been conducted, thereby completing closing. Thus, in the upper surface 71a functioning as the exhaust gas supply side (inlet side), one outlet-side hexagonal cell 70Hout that is surrounded by six inlet-side hexagonal cells 70Hin respectively adjoining the periphery of the upper surface 71a is closed.

(Withdrawing Step)

Figure 13:
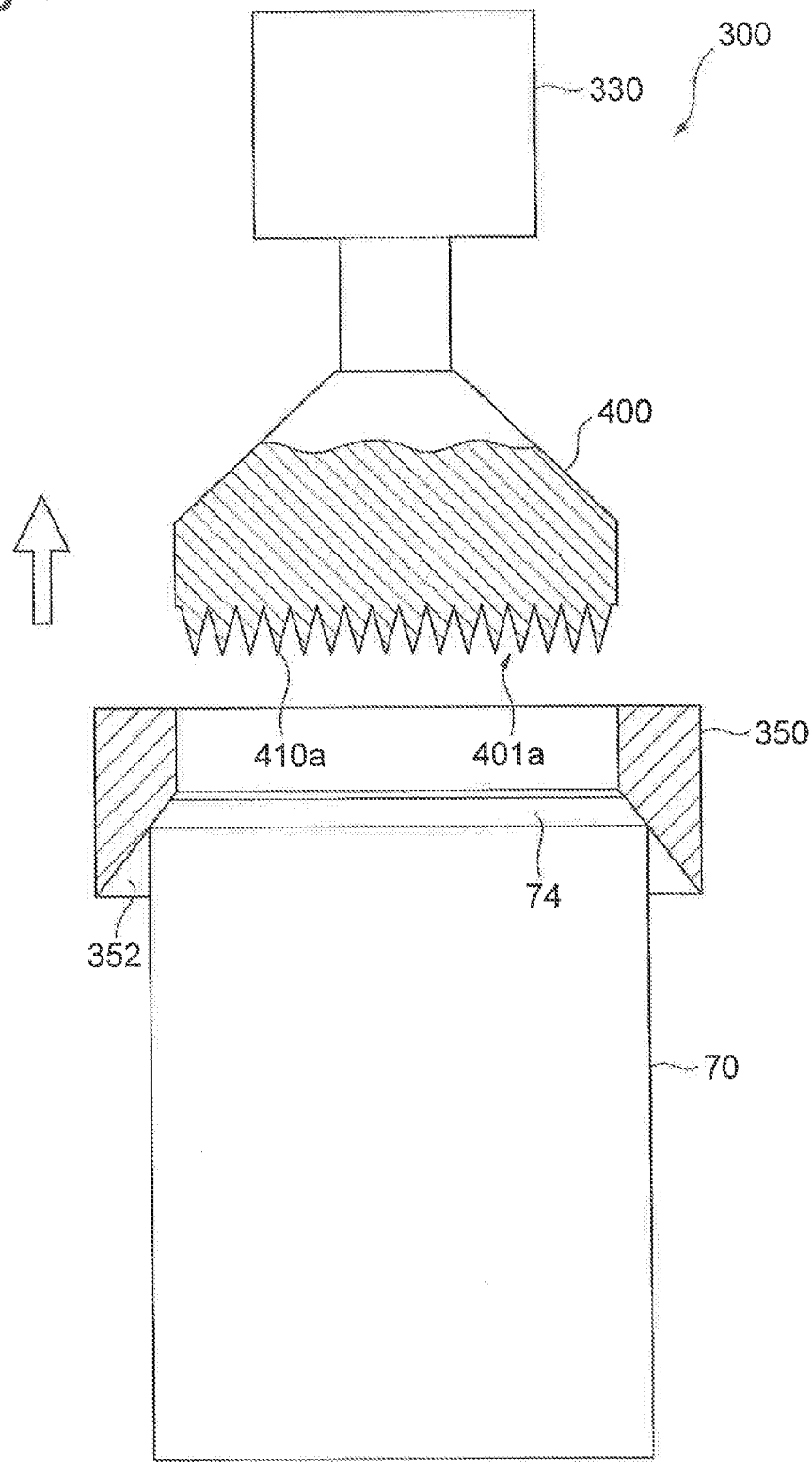
FIG. 13 is a partial cross-sectional view illustrating a step of withdrawing the green honeycomb molded body having hexagonal cells according to the embodiment.

Subsequently, the step of withdrawing the center closing jig 400 and the outer periphery closing jig 350 from the green honeycomb molded body 70 (a center closing jig withdrawing step and an outer periphery closing jig withdrawing step) will be described. As illustrated in FIG. 13, after closing the upper surface 71a, the center closing jig 400 is first withdrawn, and the outer periphery closing jig 350 is then withdrawn. Thus, when the center closing jig 400 is withdrawn in such a state that the outer periphery closing jig 350 has been mounted, the center closing jig 400 can be withdrawn without changing the shape of the green honeycomb molded body 70. The center closing jig 400 may be withdrawn after the withdrawal of the outer periphery closing jig 350. Alternatively, the center closing jig 400 and the outer periphery closing jig 350 may be simultaneously withdrawn.

(Outlet-Side Closing Jig)

Next, the jig that closes the lower surface 71b functioning as an exhaust gas discharge side (an outlet side) in the case where the green honeycomb molded body 70 is applied to a particulate-matter-removing filter such as a diesel particulate filter after firing will be described.

Figure 14:
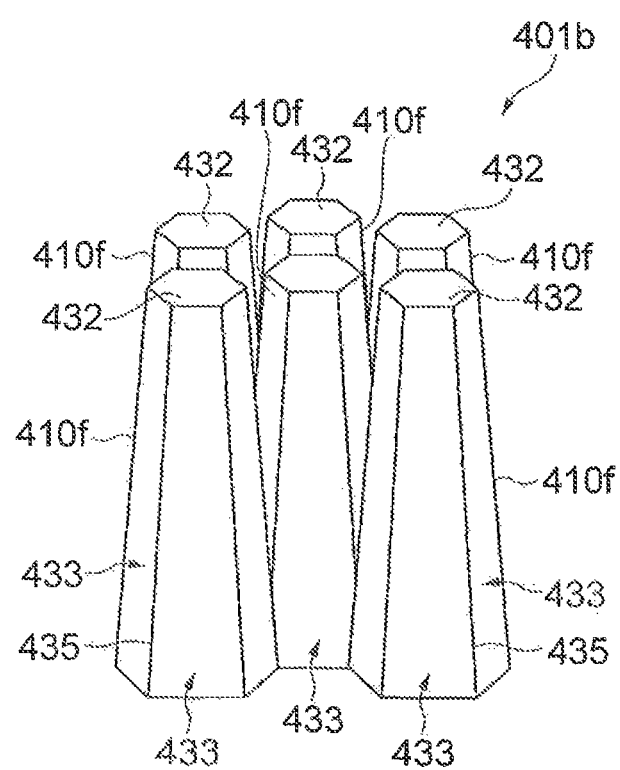
FIG. 14 is an enlarged perspective view of a site corresponding to the portion A of FIG. 3 in a closing jig for an outlet side of the green honeycomb molded body having hexagonal cells according to the embodiment.

Firstly, in the case where green honeycomb molded body 70 is applied to a particulate-matter-removing filter such as a diesel particulate filter after firing, the center closing jig 400 that closes the lower surface 71*b* functioning an exhaust gas discharge side (an outlet side) will be described. The center closing jig 400 that closes the lower surface 71*b* is different from the center closing jig 400 that closes the upper surface 71*a* only in the closing surface. Thus, the closing surface 401*b* that closes the lower surface will be described, and the other portions of the center closing jig 400 will be omitted. Further, the outer periphery closing jig 350 is the same as the outer periphery closing jig 350 that closes the upper surface 71*a* and thus explanation will be omitted. As illustrated in FIG. 14, the closing surface 401*b* that closes the lower surface 71*b* includes hexagonal truncated closing projections 410*f*. Individual closing projections 410*f* includes a hexagonal truncated tip 432, a hexagonal truncated side surface 433, and a hexagonal truncated lateral edge 435. The hexagonal truncated closing projections 410*f* may have a hexagonal pyramid shape that does not have a hexagonal truncated tip 432.

Figure 15:
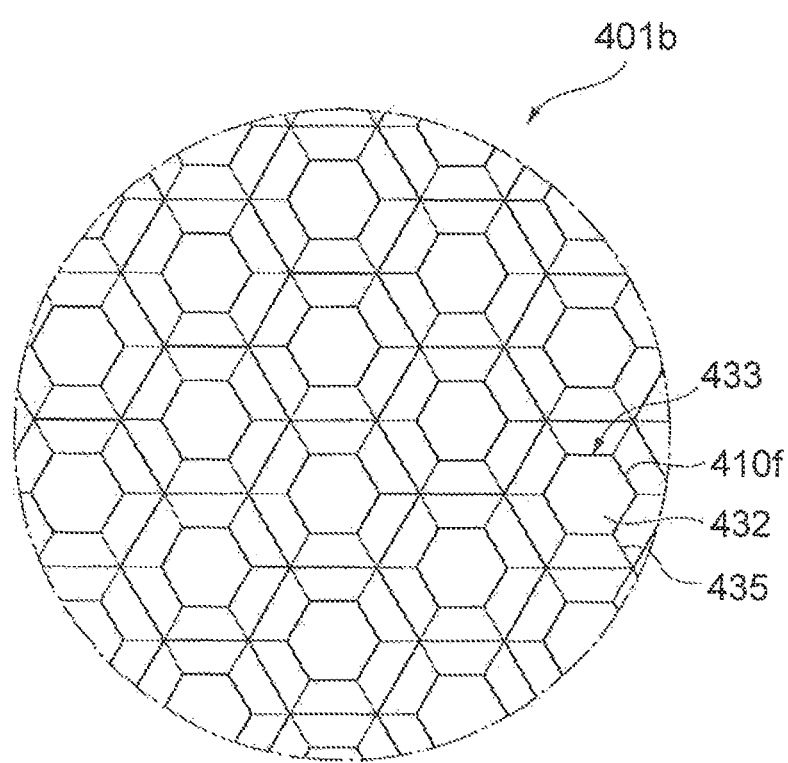
FIG. 15 is an enlarged plan view of a site corresponding to the portion A of FIG. 3 in the closing jig for the outlet side of the green honeycomb molded body having hexagonal cells according to the embodiment.

As illustrated in FIG. 15, the closing projections 410*f* are arranged so that the apexes thereof are located at positions corresponding to one outlet-side hexagonal cell 70Hout surrounded by six inlet-side hexagonal cells 70Hin that adjoin around the one outlet-side hexagonal cell 70Hout within a plurality of hexagonal cells in the green honeycomb molded body 70. The hexagonal truncated lateral edges 435 of the closing projections 410*f* are arranged so as to face the partition walls 70W of the hexagonal cells. The one outlet-side hexagonal cell 70Hout located at positions corresponding to the closing projections 410*f* is one hexagonal cell that, in the upper surface 71*a*, is located at positions corresponding to the closing projections 410*f* and the periphery of which is surrounded by six adjacent inlet-side hexagonal cells 70Hin.

In the upper surface 71*a*, the closing projections 410*a* are inserted into six inlet-side hexagonal cells 70Hin that adjoin around one outlet-side hexagonal cell 70Hout as a center, and, in the lower surface 71*b*, the closing projections 410*f* are inserted into one outlet-side hexagonal cell 70Hout, the periphery of which is surrounded by the six inlet-side hexagonal cells 70Hin into which the closing projections 410*a* have been inserted in the upper surface 71*a*. The closing projections 410*f* are arranged so that the hexagonal truncated side surfaces 433 are in contact with each other at the bottom thereof. Accordingly, a planar area is not formed at valley between the closing projections 410*f*.

The size of each hexagonal truncated tip 432 of the closing projections 410*f* is smaller than the size of the outlet-side hexagonal cells 70Hout in the green honeycomb molded body 70. The length between the hexagonal truncated side surfaces 433 that face each other at the bottom of the closing projections 410*f* is the same as the distance between centers of the outlet-side hexagonal cells 70Hout into which two adjacent closing projections 410*f* are inserted. The closing projections 410*f* in this embodiment are formed of a metal such as a tool steel or a synthetic resin. The closing projections 410*f* in this embodiment can be produced, for example, by electric discharge machining.

Figure 16:
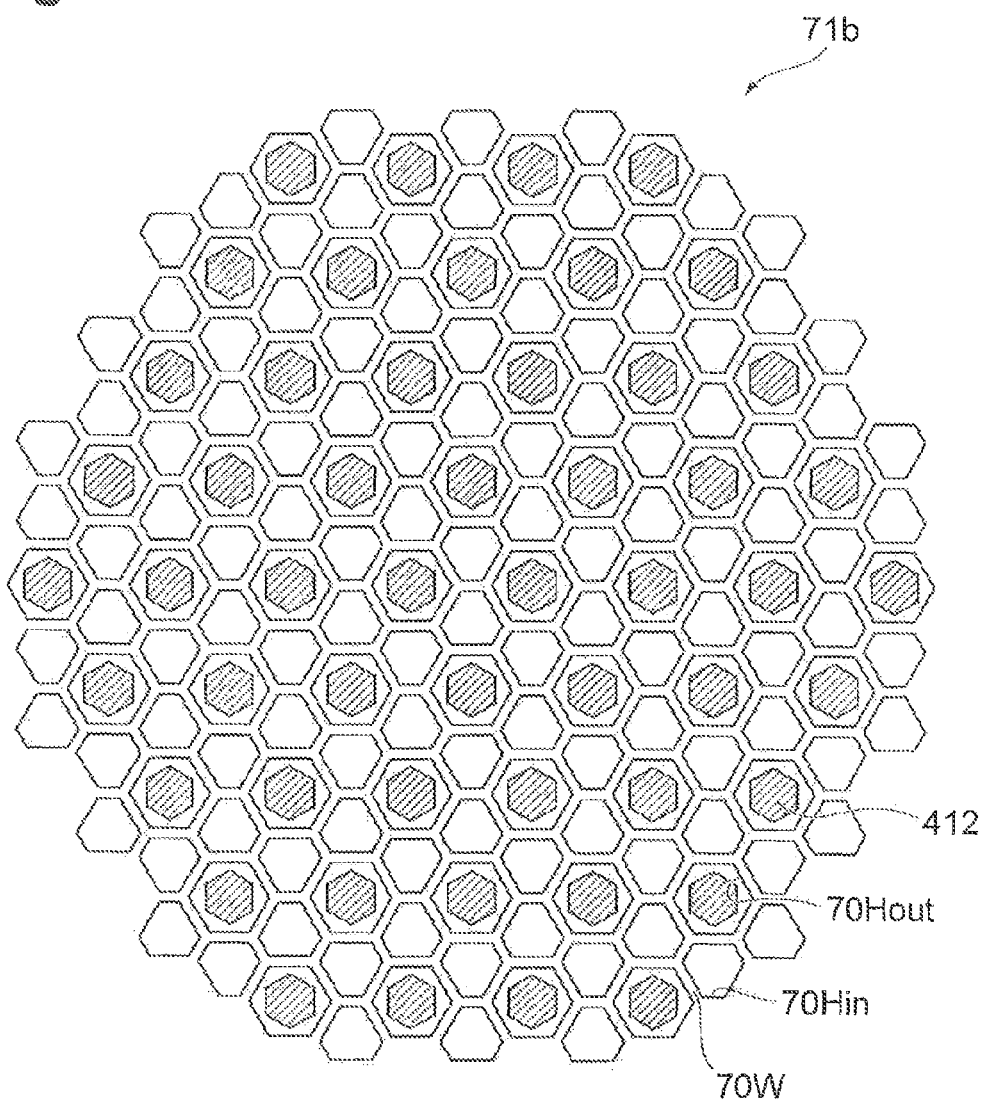
FIG. 16 is a cross-sectional view corresponding to a cross section taken on line VII-VIII of FIG. 7 in the closing step on an outlet side according to an embodiment.

The step of closing the lower surface 71*b* functioning as an exhaust gas discharge side (an outlet side) in the case where the green honeycomb molded body 70 is applied to a particulate-matter-removing filter such as a diesel particulate filter after firing (center closing step and outer periphery closing step) will be described. The step of closing the lower surface 71*b* is different from the step of closing the upper surface 71*a* described above in conjunction with FIGS. 7, 9, and 11 in the end surface to be inserted and is identical to the step of closing the upper surface 71*a* in the operation of the outer periphery closing jig 350 and the center closing jig 400. As illustrated in FIG. 7, a center closing jig 400 in the ultrasonic closing machine 300 is inserted into the end on the lower surface 71*b* side of the green honeycomb molded body 70, and, at the same time, an outer periphery closing jig 350 is inserted. The center closing jig 400 is vibrated by ultrasonic vibration from a horn 330. The tip of the closing projections 410*f* in the closing surface 401*b* is inserted into a part of the hexagonal cells. As illustrated in FIG. 16, the closing projections 410*f* are inserted into one outlet-side hexagonal cell 70Hout, the periphery of which is surrounded by six adjacent inlet-side hexagonal cells 70Hin. At that time, the hexagonal truncated lateral edges 435 in the closing projections 410*f* face the partition walls 70W in the hexagonal cells. As described above, the outlet-side hexagonal cells 70Hout into which the closing projections 410*f* are inserted in the lower surface 71*b* are inlet-side hexagonal cells 70Hin into which the closing projections 410*a* have not been inserted in the upper surface 71*a*.

As illustrated in FIG. 9, when the closing projections 410*f* are further inserted into the outlet-side hexagonal cells 70Hout, as illustrated in FIG. 16, the hexagonal truncated lateral edges 435 in the closing projections 410*f* are allowed to abut against the partition walls 70W. The closing projections 410*f* are vibrated by the ultrasonic vibration to liquefy the partition walls 70W that are pressed so as to close hexagonal cells into which the closing projections 410*f* have not been inserted and are located between the hexagonal cells into which the closing projections 410*f* have been inserted. The partition walls 70W for the hexagonal cells closed are pressed into valleys of three mutually adjacent closing projections 410*f*.

Figure 17:
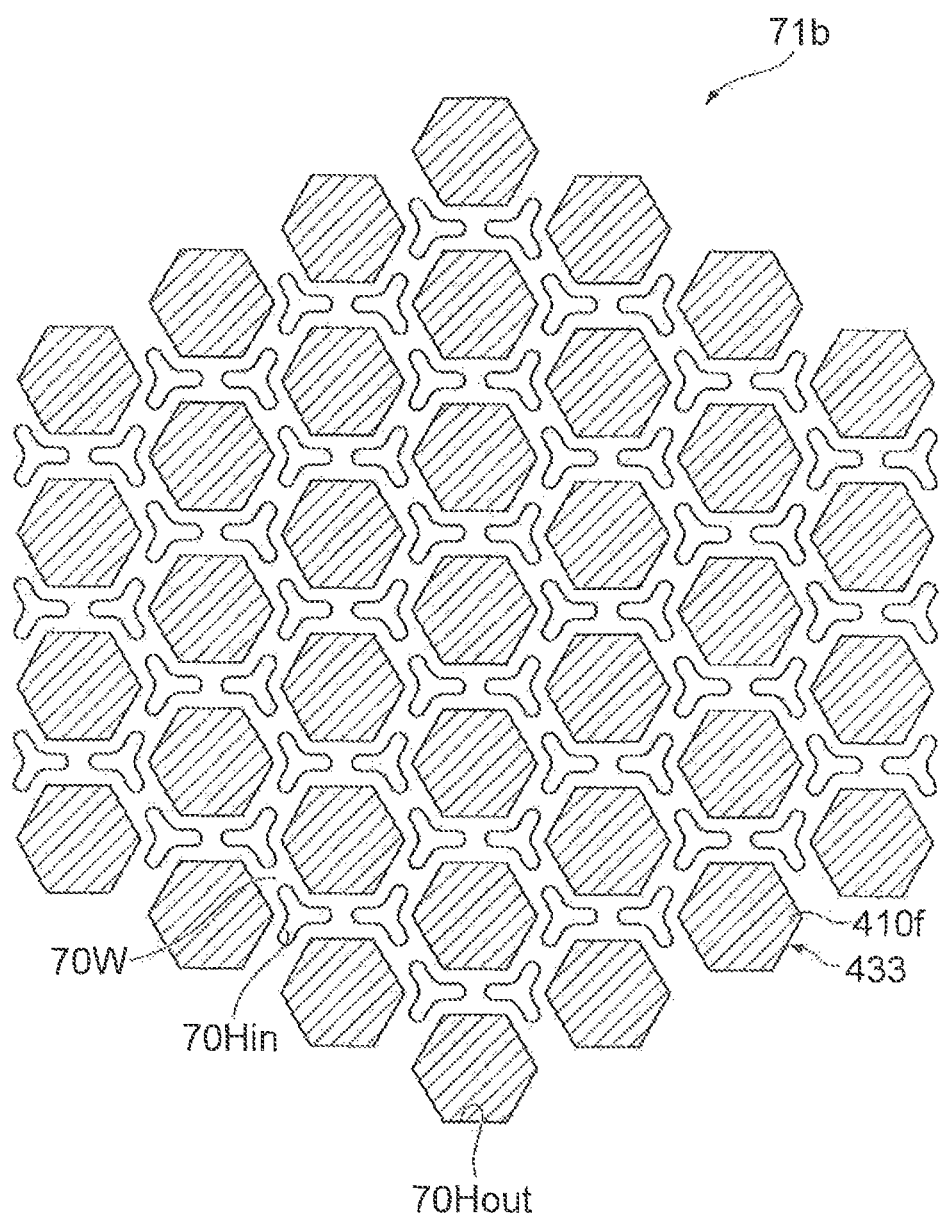
FIG. 17 is a cross-sectional view corresponding to a cross section taken on line X-X of FIG. 9 in a closing step for the outlet side according to the embodiment.

As illustrated in FIG. 11, when the closing projections 410*f* are further inserted into the outlet-side hexagonal cells 70Hout, as illustrated in FIG. 17, the partition walls 70W that have been pressed while being liquefied by the hexagonal truncated lateral edge 435 are integrally welded to each other into valleys of three mutually adjacent closing projections 410*f* to complete closing. Thus, in the lower surface 71*b* functioning as an exhaust gas discharge side (an outlet side), six hexagonal cells that adjoin around the periphery of one hexagonal cell closed in the upper surface are closed. A withdrawing step is carried out in the same manner as in the upper surface 71*a*. Thus, after the completion of closing in the upper surface 71*a* and the lower surface 71*b*, the honeycomb structure is produced through a withdrawing step, a drying step, and a firing step.

Figure 18:
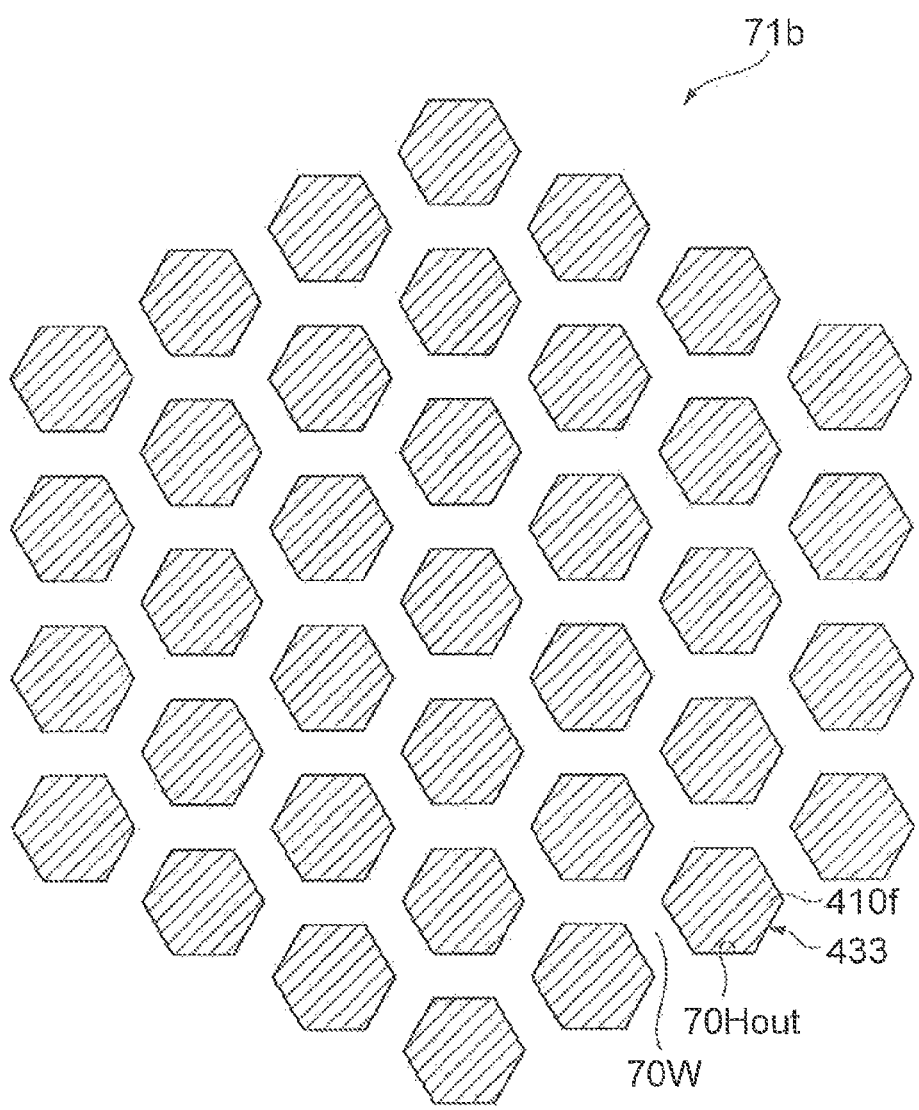
FIG. 18 is a cross-sectional view corresponding to a cross section taken on line XII-XII of FIG. 11 the closing step for the outlet side according to the embodiment.

In this embodiment, when closing the lower surface 71*b* functioning as an exhaust gas discharge side (an outlet side), closing is carried out with hexagonal truncated closing projections 410*f*. As illustrated in FIG. 18, hexagonal cells that have not been closed and located on the lower surface 71*b* side of the green honeycomb molded body 70 are widened to a hexagonal shape that is similar to that before the closing step, and, thus, smoother closing is possible as compared with widening to a circular shape.

Further, in this embodiment, since the closing projections 410*f* are mutually densely arranged, the end of the welded partition walls 70W can be rendered thin and small. Accordingly, the area of the closed portion is small, and, thus, the pressure loss on the outlet side can be reduced. The treatment that closes the inlet-side end surface and the treatment that closes the outlet-side end surface may be carried out separately from each other, or alternatively, the treatment that closes the inlet-side end surface and the treatment that closes the outlet-side end surface may be simultaneously carried out.

(Honeycomb Structure)

Figure 19:
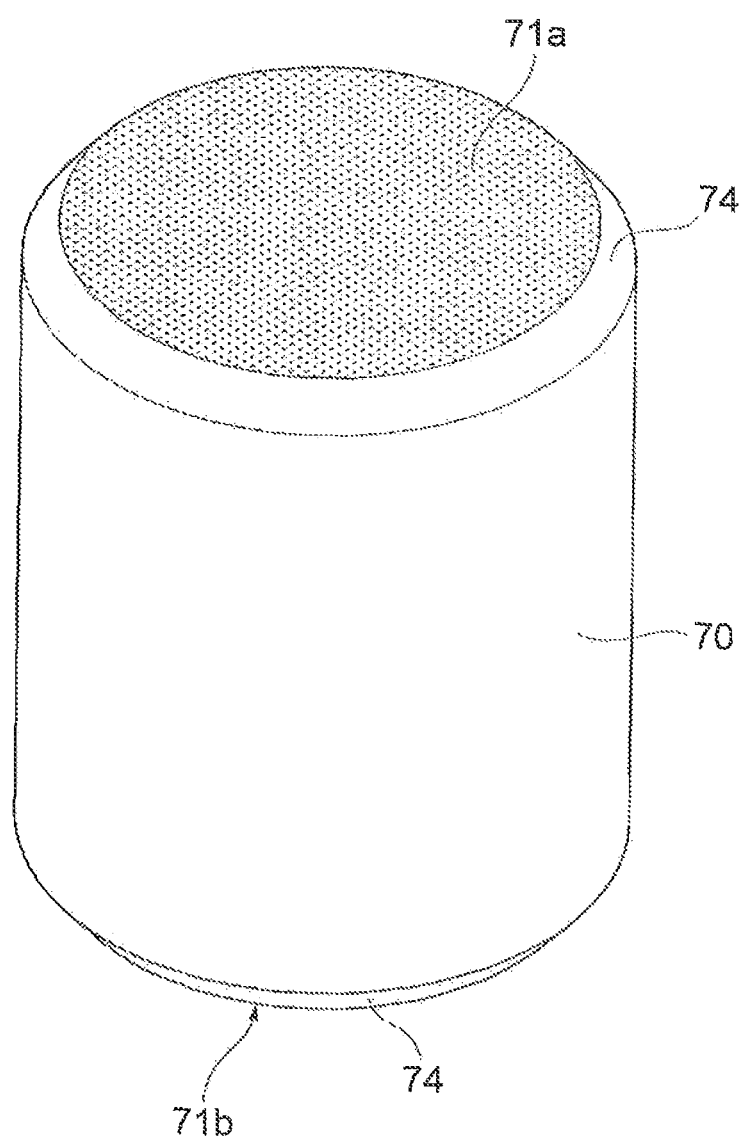
FIG. 19 is a perspective view of the honeycomb structure.

The honeycomb structure produced by the above production method is illustrated in FIG. 19. As illustrated in FIG. 19, the honeycomb structure has the chamfered portion 74 with the outer diameter being continuously reduced towards the end surface. The degree of chamfering in the chamfered portion in the honeycomb structure (difference between radius of the end surface of honeycomb structure before chamfering and radius of end surface (for example, upper surface 71*a*)) after chamfering is 1 to 10 mm and 2 to 3 mm. The chamfer angle (an angle that the side surface of the honeycomb structure makes with the chamfered portion 74) is 10 to 80 degrees and 30 to 60 degrees.

Figure 20:
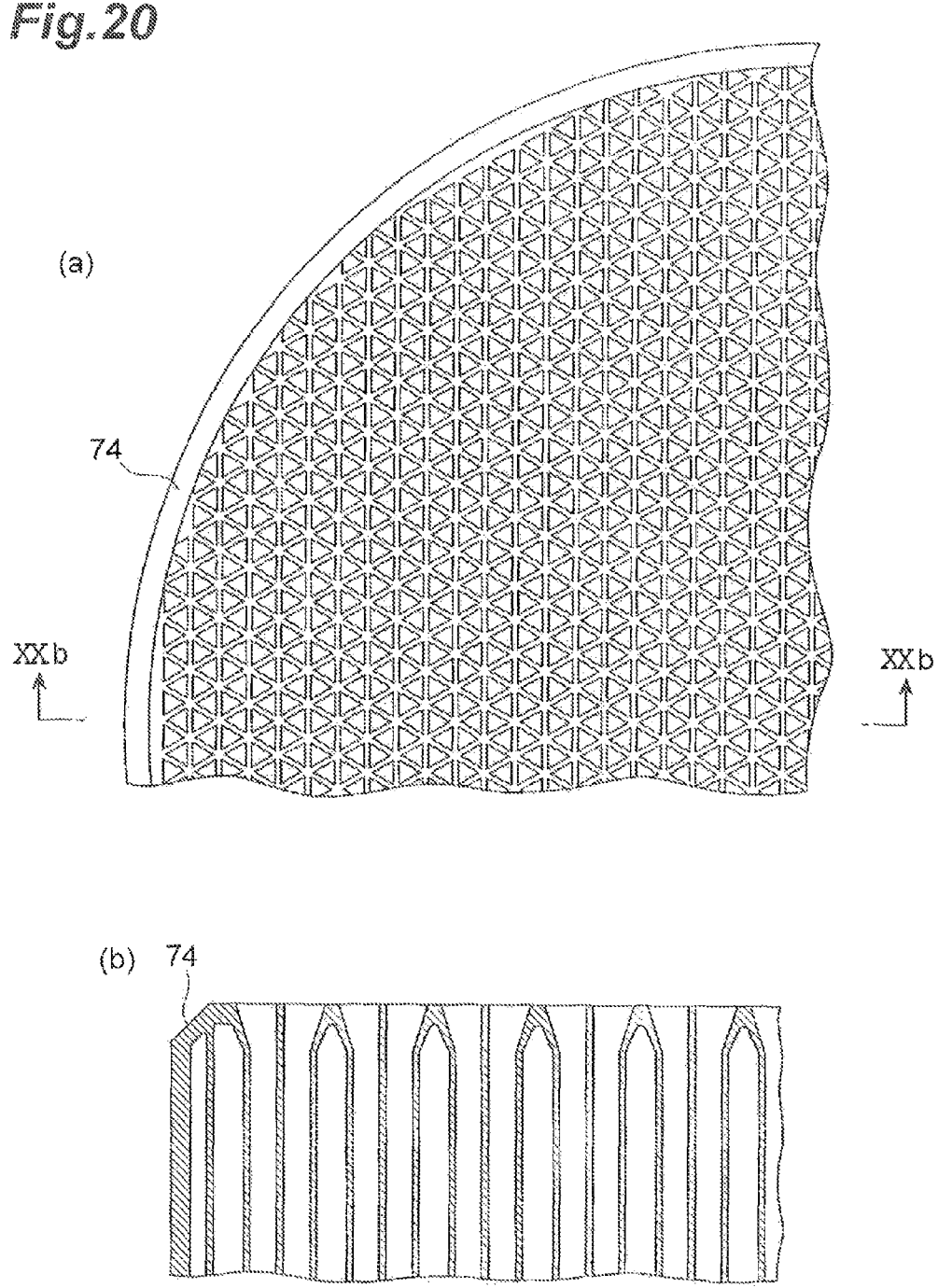
FIG. 20 is a cross-sectional view of the honeycomb structure, wherein (a) is a top view of hexagonal cells on an inlet side and (b) is a cross-sectional view of hexagonal cells on an inlet side.
Figure 21:
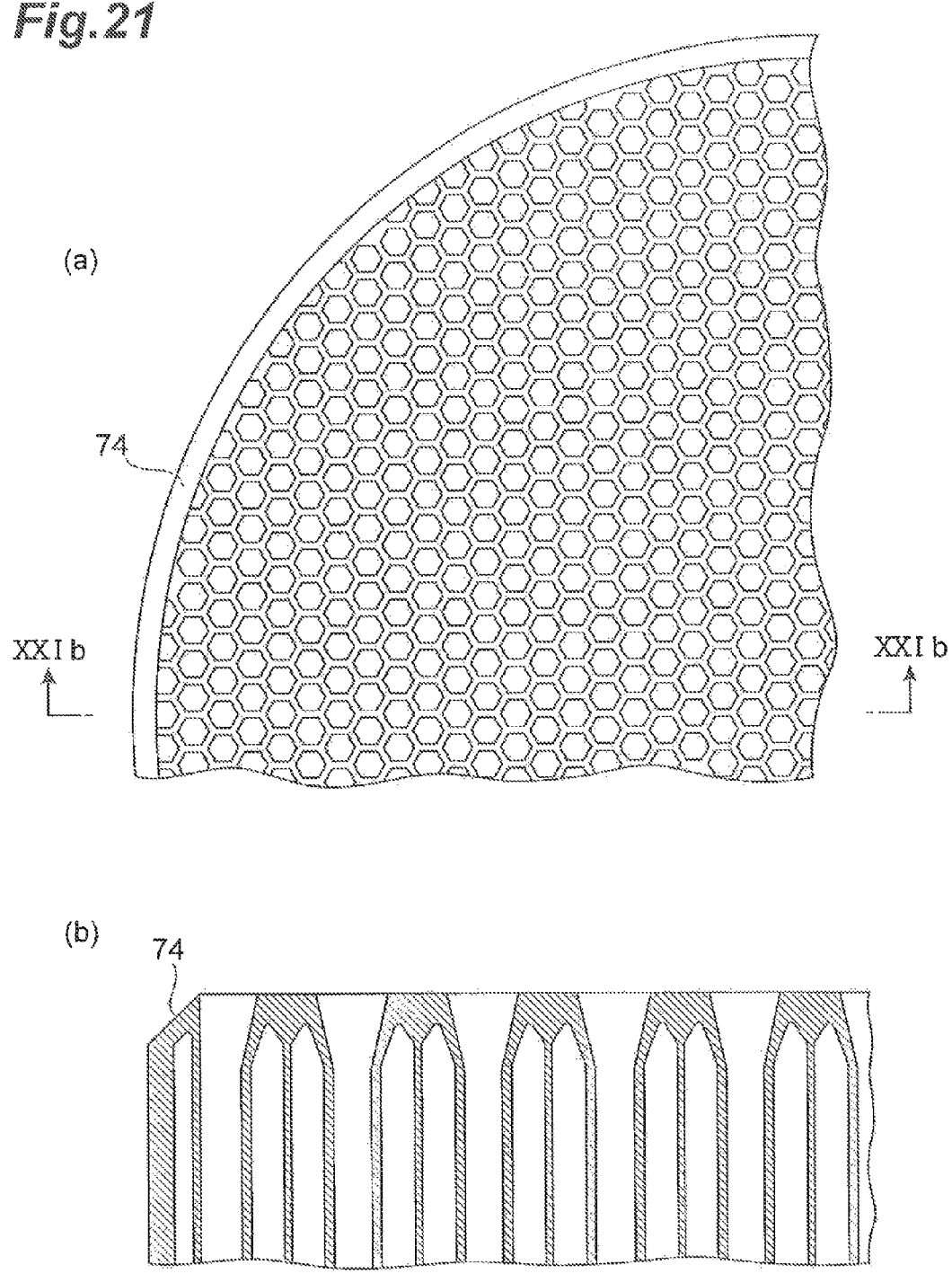
FIG. 21 is a cross-sectional view of the honeycomb structure, wherein (a) is a top view of hexagonal cells on an outlet side and (b) is a cross-sectional view of hexagonal cells on an outlet side.

Subsequently, the upper surface 71*a* after the closing step is illustrated in FIG. 20. The upper surface 71*a* is illustrated in FIG. 20(*a*), and a cross section of the upper surface 71*a* is illustrated in FIG. 20(*b*). As illustrated in FIG. 21 (*b*), the chamfered portion 74 is formed by the outer periphery closing jig 350 to close the outer periphery (an end surface outer periphery) in the upper surface 71*a*, thereby clogging the through-holes around the outer periphery. The lower surface 71*b* after the closing step is illustrated in FIG. 21. The lower surface 71*b* is illustrated in FIG. 21(*a*), and a cross section of the lower surface 71*b* is illustrated in FIG. 21(*b*). As illustrated in FIG. 21(*b*), the chamfered portion 74 is formed by the outer periphery closing jig 350 to close the outer periphery of the lower surface 71*b*, thereby clogging the through-holes around the outer periphery.

Thus, the through-holes at the outer periphery of the end surface in the green honeycomb molded body 70 is closed by the outer periphery closing jig 350, and, thus, a gas and a liquid cannot be passed through the non-uniform through-holes at the outer periphery of the end surface. Further, since the outer periphery of the end surface has a chamfered portion, making it possible to keep an easy-to-use shape (a shape that can easily be attached to the apparatus).

In this embodiment, there is provided a method for producing a honeycomb structure, the method comprising: inserting a center closing jig 400 into a part of a plurality of hexagonal cells at the center of an end surface in a green honeycomb molded body 70 in which a plurality of hexagonal cells (inlet-side hexagonal cells 70Hin and outlet-side hexagonal cells 70Hout) mutually partitioned by partition walls 70W are open at the end surface of a columnar body to join the partition walls 70W to each other with the center closing jig 400, thereby closing the hexagonal cells at the center of the end surface; and pressing the outer periphery of the end surface including a plurality of hexagonal cells in the green honeycomb molded body 70 by a cylindrical outer periphery closing jig 350 having an inner peripheral surface with the inner diameter being continuously reduced from a lower end surface 351*b* as one end surface to an upper end surface 351*a* as the other end surface to collapse hexagonal cells at the outer periphery of the end surface, thereby closing the hexagonal cells at the outer periphery of the end surface.

In this case, since the outer periphery of the end surface of the green honeycomb molded body 70 is pressed by a jig with the inner peripheral surface being tapered, non-uniform through-holes included in the outer periphery of the end surface can be closed. Further, since the outer periphery of the end surface is pressed by a jig with the inner peripheral surface being tapered, the necessity of adjusting the closing jig according to the non-uniform hexagonal cells at the periphery can be eliminated.

Furthermore, since the outer periphery of the end surface of the green honeycomb molded body 70 is pressed by a jig with the inner peripheral surface being tapered, concaves at the outer periphery produced in cutting the green honeycomb molded body 70 can be corrected.

Furthermore, since the outer periphery of the end surface of the green honeycomb molded body 70 is pressed by a jig with the inner peripheral surface being tapered, chipping around the outer periphery of the end surface of the green honeycomb molded body 70 that is likely to occur in firing after molding/closing can be prevented.

Further, in this embodiment, after the withdrawal of the center closing jig 400, the outer periphery closing jig 350 is withdrawn. In this case, since the center closing jig 400 is withdrawn in such a state that the outer periphery closing jig 350 presses the outer periphery of the end surface, the center closing jig 400 can easily be withdrawn. Further, the deformation of the outer periphery of the end surface when withdrawing the center closing jig 400 can be prevented.

Furthermore, in this embodiment, the insertion of the center closing jig 400 and pressing of the outer periphery closing jig 350 against the outer periphery of the end surface of the green honeycomb molded body 70 are simultaneously carried out. In this case, the outer periphery closing jig 350 can be pressed against the outer periphery of the end surface while accurately inserting the center closing jig 400 into the positions of the hexagonal cells.

The embodiments of the present invention are not limited to the above ones, and various modifications are possible. For example, in the above embodiments, the closed green honeycomb molded body 70 is closed by welding between the partition walls 70W. The embodiments of the present invention are not limited to this one. For example, the closed green honeycomb molded body 70 includes those in which closing has been carried out by contact bonding between the partition walls 70W. Further, the closed green honeycomb molded body 70 includes those in which vibration at a lower frequency than ultrasonic waves, for example, at 1 kHz or less, is applied to contact-bond the partition walls 70W to each other for closing.

In the above embodiments, closing treatment is carried out only once for the center and outer periphery of each end surface of the green honeycomb molded body 70. Alternatively, the closing treatment of the center and outer periphery of the end surface may be repeated a plurality of times according to need. This can enhance the deformability and weldability of the partition walls 70W. A method in which a closing paste is added to cells before the insertion of the closing jig or a method in which the closing paste is additionally coated on closing sites after drying or firing of the green honeycomb molded body 70 may be adopted, although these methods have not been described in the above embodiments.

Further, in the above embodiment, the through-holes are described as hexagonal. However, the cell shape of the through-holes is not limited to a hexagonal shape, and other polygonal shapes (for example, quadrangular shapes or octagonal shapes), or a combination thereof is also possible. Further, for the closing jig, polygonal pyramid shapes or polygonal pyramid platform shapes are also possible according to the cell shape. Further, the shape of the jig on the inlet side and the shape of the jig on the outlet side may be different or the same.

In the above embodiments, when closing the outer periphery of the end surface of the green honeycomb molded body 70 and when the closing projections located at the outermost periphery of the center closing jig 400 is brought into contact with the outer periphery closing jig 350, the portions of the closing projections that come into contact with the outer periphery closing jig 350 may be removed by machining such as grinding or cutting, or alternatively the closing projections per se that come into contact with the outer periphery closing jig 350 may be removed from the center closing jig 400.

In the above embodiments, the center closing jig 400 and the outer periphery closing jig 350 are separately provided. Alternatively, the center closing jig 400 and the outer periphery closing jig 350 may have an integrated structure originally. In this case, the jig has a structure of the center closing jig 400 integrated with the outer periphery closing jig 350 as illustrated in FIG. 7, and the closing step and the withdrawing step are simultaneously carried out with the center closing jig 400 and the outer periphery closing jig 350.

INDUSTRIAL APPLICABILITY

According to the method for producing a honeycomb structure according to one aspect of the present invention, a jig, and a honeycomb structure, the outer periphery of the end surface of the green honeycomb molded body is pressed with a jig with the inner peripheral surface being tapered, and, thus, non-uniform through-holes included in the outer periphery of the end surface can be closed.

REFERENCE SIGNS LIST

70 . . . green honeycomb molded body
71*a* . . . upper surface
71*b* . . . lower surface
70Hin . . . inlet-side hexagonal cells
70Hout . . . outlet-side hexagonal cells
70W . . . partition walls
73 . . . round partition wall joined end
74 . . . chamfered portion
300 . . . ultrasonic closing machine
310 . . . ultrasonic signal transmitter
320 . . . ultrasonic vibrator
330 . . . horn
350 . . . outer periphery closing jig
351*a* . . . upper end surface
351*b* . . . lower end surface
352 . . . inner peripheral surface
400 . . . center closing jig
401*a*, 401*b* . . . closing surface
410*a*, 410*f* . . . closing projections
411 . . . triangular pyramid-shaped base
412 . . . conical tip
413 . . . triangular pyramid lateral surface
414 . . . roundness chamfering valley
415 . . . roundness chamfering lateral edge
432 . . . hexagonal truncated tip
433 . . . hexagonal truncated side surface
435 . . . hexagonal truncated lateral edge.

The invention claimed is:

1. A honeycomb structure comprising a columnar body with a plurality of holes being open at an end surface thereof, wherein
in a green honeycomb molded body in which a plurality of through-holes mutually partitioned by partition walls are open at an end surface of a columnar body, a part of a plurality of through-holes at the center of the end surface is closed,
the partition walls portioning the closed through-holes at the center of the end surface being integrally joined to each other,
an outer periphery of the end surface has a chambered portion with the outer diameter being continuously reduced towards the end surface, thereby closing the through-holes at the outer periphery of the end surface, and
the green honeycomb molded body has been fired to produce the honeycomb structure.

2. The honeycomb structure according to claim 1, wherein the through-holes opened at the one end surface of a columnar body have triangular shape and the through-holes opened at the other end surface of a columnar body have hexagonal shape.

* * * * *